US010889383B2

(12) United States Patent
Randall

(10) Patent No.: US 10,889,383 B2
(45) Date of Patent: Jan. 12, 2021

(54) SYSTEMS AND METHODS FOR MAINTAINING LEVITATION OF A ROTOR RELATIVE TO A STATOR

(71) Applicant: MagLev Aero Inc., Hopkinton, MA (US)

(72) Inventor: Ian Morris Randall, Hopkinton, MA (US)

(73) Assignee: MagLev Aero Inc., Hopkinton, MA (US)

(*) Notice: Subject to any disclaimer, the term of this patent is extended or adjusted under 35 U.S.C. 154(b) by 0 days.

(21) Appl. No.: 16/776,356

(22) Filed: Jan. 29, 2020

(65) Prior Publication Data

US 2020/0277067 A1   Sep. 3, 2020

Related U.S. Application Data

(63) Continuation of application No. PCT/US2019/027938, filed on Apr. 17, 2019.

(Continued)

(51) Int. Cl.
| *B64D 27/24* | (2006.01) |
| *B64C 13/26* | (2006.01) |
| *B64C 29/02* | (2006.01) |
| *B64C 27/473* | (2006.01) |
| *B64C 27/72* | (2006.01) |
| *B64D 35/02* | (2006.01) |
| *B64C 27/80* | (2006.01) |
| *B64C 27/10* | (2006.01) |
| *B64C 29/00* | (2006.01) |

(Continued)

(52) U.S. Cl.
CPC .............. *B64D 27/24* (2013.01); *B64C 13/26* (2013.01); *B64C 27/473* (2013.01); *B64C 27/72* (2013.01); *B64C 27/80* (2013.01); *B64C 29/02* (2013.01); *B64D 35/02* (2013.01); *B64C 27/10* (2013.01); *B64C 27/20* (2013.01); *B64C 29/0025* (2013.01); *B64D 35/06* (2013.01)

(58) Field of Classification Search
None
See application file for complete search history.

(56) References Cited

U.S. PATENT DOCUMENTS

| 3,997,131 A | 12/1976 | Kling et al. |
| 4,807,830 A | 2/1989 | Horton |

(Continued)

OTHER PUBLICATIONS

International Search Report and Written Opinion on PCT PCT/US2019/027938 dated Aug. 23, 2019 (12 pages).

(Continued)

*Primary Examiner* — Naishadh N Desai
(74) *Attorney, Agent, or Firm* — Foley & Lardner LLP

(57) ABSTRACT

Systems and methods relate to a vertical takeoff and landing (VTOL) platform that can include a stator and a rotor magnetically levitated by the stator. The rotor and stator can be annular, such that the rotor rotates about a rotational axis. The stator can include magnets that provide guidance, levitation, and drive forces to drive the rotor, as well as to control operation of rotor blades of the rotor that can be independently rotated to specific pitch angles to control at least one of lift, pitch, roll, or yaw of the VTOL platform. Various controllers can be used to enable independent and redundant control of components of the VTOL platform.

20 Claims, 13 Drawing Sheets

Related U.S. Application Data

(60) Provisional application No. 62/775,253, filed on Dec. 4, 2018, provisional application No. 62/659,013, filed on Apr. 17, 2018.

(51) Int. Cl.
    *B64D 35/06*    (2006.01)
    *B64C 27/20*    (2006.01)

(56) References Cited

U.S. PATENT DOCUMENTS

| | | | |
|---|---|---|---|
| 5,967,749 A * | 10/1999 | Eaves | B63H 3/06 |
| | | | 416/155 |
| 6,057,622 A | 5/2000 | Hsu | |
| 6,575,401 B1 | 6/2003 | Carver | |
| 6,750,588 B1 | 6/2004 | Gabrys | |
| 7,410,123 B2 | 8/2008 | Nunnally et al. | |
| 7,825,554 B2 | 11/2010 | Bastian et al. | |
| 8,074,922 B2 | 12/2011 | Bojiuc | |
| 9,174,728 B2 * | 11/2015 | Altmikus | H02K 16/00 |
| 9,758,245 B2 | 9/2017 | Ries | |
| 2005/0067527 A1 * | 3/2005 | Petersen | B64C 27/56 |
| | | | 244/17.11 |
| 2006/0055261 A1 * | 3/2006 | Walker | H02K 21/222 |
| | | | 310/112 |
| 2007/0228859 A1 | 10/2007 | Rao | |
| 2009/0001831 A1 | 1/2009 | Cho et al. | |
| 2011/0031760 A1 * | 2/2011 | Lugg | H02K 7/1869 |
| | | | 290/55 |
| 2012/0262095 A1 | 10/2012 | Smith et al. | |
| 2015/0091405 A1 | 4/2015 | Sakamoto et al. | |
| 2016/0281778 A1 | 9/2016 | Li et al. | |
| 2016/0298538 A1 | 10/2016 | Lugg | |
| 2016/0304193 A1 * | 10/2016 | Marcel | G05D 1/102 |
| 2018/0083518 A1 * | 3/2018 | Chen | H02K 1/16 |
| 2019/0210717 A1 * | 7/2019 | Lauder | H02K 21/24 |
| 2020/0148333 A1 | 5/2020 | Randall | |
| 2020/0148342 A1 | 5/2020 | Randall | |
| 2020/0156779 A1 | 5/2020 | Randall | |
| 2020/0161991 A1 | 5/2020 | Randall | |
| 2020/0204020 A1 | 6/2020 | Randall | |

OTHER PUBLICATIONS

Non-Final Office Action on U.S. Appl. No. 16/744,897 dated Aug. 25, 2020.

Non-Final Office Action on U.S. Appl. No. 16/787,845 dated Aug. 24, 2020.

Notice of Allowance on U.S. Appl. No. 16/744,915 dated May 27, 2020.

* cited by examiner

US 10,889,383 B2

SYSTEMS AND METHODS FOR MAINTAINING LEVITATION OF A ROTOR RELATIVE TO A STATOR

CROSS-REFERENCE TO RELATED APPLICATIONS

The present disclosure is a continuation of P.C.T. Application No. PCT/US2019/027938, titled "SYSTEMS AND METHODS OF VERTICAL TAKEOFF AND LANDING USING MAGNETIC LEVITATION," filed Apr. 17, 2019, which claims the benefit of and priority to U.S. Provisional Application No. 62/659,013, titled "SYSTEMS AND METHODS FOR VERTICAL TAKEOFF AND LANDING WITH MAGNETIC PROPULSION," filed Apr. 17, 2018, and U.S. Provisional Application No. 62/775,253, titled "MAGNETIC LEVITATION FOR VERTICAL TAKEOFF AND LANDING," filed Dec. 4, 2018, the disclosures of which are incorporated herein by reference in their entireties.

TECHNICAL FIELD

The present disclosure relates generally to vertical takeoff and landing. More particularly, the present disclosure relates to magnetic levitation for vertical takeoff and landing.

BACKGROUND

Various airborne platforms can perform vertical takeoff and landing (VTOL), in which the platforms can hover, take off, and land vertically. VTOL platforms can include fixed wing platforms and rotary wing platforms. VTOL platforms can include unmanned aerial vehicles. VTOL platforms can have distributed electrical propulsion, and can have tilt rotor and/or tilt wing configurations.

Typically, VTOL platforms rely on combustion-based power generation to generate lift and other movement forces. In addition, VTOL platforms may have relatively large form factors. As such, existing VTOL platforms may have technical limitations that make such platforms difficult to use in urban environments and personal use modes.

SUMMARY

At least one aspect of the present disclosure relates to a VTOL platform. The VTOL platform includes a rotor, a stator, a flight controller, and a motor controller. The rotor includes a plurality of rotor blades oriented about a rotor axis and radially spaced from the stator. Each rotor blade is coupled to a rotor arm such that rotation of the rotor arm causes the rotor blade to rotate about a rotor pitch axis. The rotor arm is coupled to a first rotor magnet spaced from a second rotor magnet. The stator includes a plurality of electromagnets. The flight controller is configured to receive a movement instruction, extract a desired movement from the movement instruction, and generate one or more flight commands configured to cause the rotor to generate at least one of thrust, moment of force about a yaw axis, moment of force about a platform pitch axis, or moment of force about a roll axis. The motor controller is configured to receive the one or more flight control commands and drive electrical signals through the electromagnets based on the one or more flight control commands. The plurality of electromagnets are configured to output electromagnetic fields corresponding to the electrical signals to drive the rotor magnets of the rotor to rotate the rotor about the rotor axis, rotate the rotor blade about the blade neutral pitch axis, and cause the rotor to generate the at least one of the thrust, the moment of force about the yaw axis, the moment of force about the platform pitch axis, or the moment of force about the platform roll axis.

At least one aspect of the present disclosure relates to a rotor for operation with a stator. The rotor includes an annular rotor base defining a rotational axis and comprising a plurality of rotor segments arranged around the stator. Each rotor segment includes a sidewall spaced from the rotational axis, a first rotor wall extending from a first end of the sidewall and towards the rotational axis, and a second rotor wall extending from a second end of the sidewall and towards the rotational axis, the second rotor wall spaced from the first rotor wall, the rotor defining a rotor axis through the first rotor wall and the second rotor wall and parallel to the rotational axis. Each rotor segment includes at least one first rotor magnet coupled with the first rotor wall, the at least one first rotor magnet configured to maintain a first space between the first rotor wall and a first stator magnet along the rotor axis. Each rotor segment includes at least one second rotor magnet coupled with the second rotor wall, the at least one second rotor magnet configured to maintain a second space between the second rotor wall and a second stator magnet along the rotor axis. Each rotor segment includes at least one third rotor magnet coupled with the sidewall and spaced from one or more propulsion magnets of the stator. The rotor is configured to be driven by the propulsion magnets via a magnetic field of the one or more propulsion magnets interacting with the at least one third rotor magnet.

At least one aspect relates to a stator for operation with a rotor. The stator includes an annular stator base comprising a plurality of stator segments, the stator base defining a central axis. Each stator segment includes a sidewall, a support structure extending from the sidewall, at least one first stator magnet coupled with a first surface of the support structure, at least one second stator magnet coupled with a second surface of the support structure opposite the first surface, and at least one propulsion magnet. The at least one first stator magnet and the at least one second stator magnet define a stator axis parallel to the central axis, the at least one first stator magnet configured to maintain a first space between a first rotor magnet of the rotor and the at least one first stator magnet along the stator axis, and the at least one second stator magnet configured to maintain a second space between a second rotor magnet of the rotor and the at least one second stator magnet along the stator axis. The at least one propulsion magnet is coupled with the support structure and spaced from one or more third rotor magnets of the rotor, the at least one propulsion magnet configured to output a magnetic field responsive to a control signal to drive the rotor about the central axis.

At least one aspect relates to a rotor control system. The rotor control system includes a rotor and a stator. The rotor includes a first rotor magnetic component aligned with one or more first stator coils, a second rotor magnetic component aligned with one or more second stator coils and adjacent to the first rotor magnetic component, an arm connecting the first rotor magnetic component and the second rotor magnetic component, and a first rotor blade fixed to the arm. A first arm end of the is arm coupled with the first rotor magnetic component and a second arm end of the arm coupled with the second rotor magnetic component defining an arm angle which changes based on a first magnetic force applied to the first rotor magnetic component relative to a second magnetic force applied to the second rotor magnetic component. The first rotor blade extends from the arm along a blade pitch axis, the first rotor blade defining a blade pitch angle relative to the blade pitch axis, the blade pitch angle corresponding to the arm angle. The stator includes a plurality of electromagnets configured to output at least a first magnetic field that drives the first rotor magnetic component and a second magnetic field that drives the second rotor magnetic component responsive to at least one control signal, the at least one control signal causing the first magnetic field to apply the first magnetic force on the first rotor magnetic component and the second magnetic field to apply the second magnetic force on the second magnetic component to control the blade pitch angle.

At least one aspect relates to a rotor control system. The rotor control system includes a rotor and a stator. The rotor includes an annular rotor base defining a rotational axis and comprising a plurality of rotor segments arranged around the stator. Each rotor segment includes a first rotor blade configured to be rotated about a blade pitch axis perpendicular to the rotational axis, a power receiver circuit, a motor that rotates using power received via the power receiver circuit for rotating the first rotor blade about the blade pitch axis, a motor controller that provides a motor signal to the motor for rotating the first rotor blade about the blade pitch axis responsive to a control signal, and a first wireless transceiver that receives the control signal and provides the control signal to the motor controller. The stator includes a second wireless transceiver that receives a control command and wirelessly transmits the control signal to the first wireless transceiver based on the control command, and a power transmitter circuit that outputs a magnetic field that interacts with the power receiver circuit to provide power to the power receiver circuit.

At least one aspect relates to a system. The system includes a rotor and a stator. The rotor includes a sidewall, a first rotor wall extending from a first end of the sidewall, and a second rotor wall extending from a second end of the sidewall, the second rotor wall spaced from the first rotor wall, at least one first rotor magnet coupled with the first rotor wall, and at least one second rotor magnet coupled with the second rotor wall. The stator includes a support structure extending between the first rotor wall and second rotor wall, at least one first stator magnet coupled with a first surface of the support structure and proximate to the at least one first rotor magnet, the at least one first rotor magnet inducing a current in the at least one first stator magnet corresponding to a first distance between the at least one first stator magnet and at least one first rotor magnet, and at least one second stator magnet coupled with a second surface of the support structure opposite the first surface and proximate to the at least one second rotor magnet, the at least one second stator magnet electrically coupled with the at least one first stator magnet to receive the current from the first stator magnet, the at least one second stator magnet outputting a magnetic field having a magnetic field strength based on the current from the first stator magnet, the magnetic field interacting with the at least one second rotor magnet to control a second distance between the at least one second stator magnet and the at least one second rotor magnet.

At least one aspect relates to a system. The system includes a rotor and a stator. The rotor includes a sidewall, a rotor wall extending from an end of the sidewall, and at least one rotor magnet coupled with the rotor wall. The stator includes a support structure adjacent the rotor wall, a first stator magnet coupled with a surface of the support structure proximate to the at least one rotor magnet, the at least one rotor magnet inducing a current in the first stator magnet corresponding to a first magnetic force of a first magnetic field between the first stator magnet and the at least one rotor magnet, and a second stator magnet coupled to the surface of the support structure, the second stator magnet electrically coupled to the first stator magnet, the second stator magnet receiving the current from the first stator magnet to control a second magnetic force of a second magnetic field between the second stator magnet and the at least one rotor magnet.

At least one aspect relates to a system. The system includes a rotor and a stator. The rotor includes a rotor sidewall defining a rotational axis, at least one rotor blade coupled with and transverse the sidewall along a first surface of the sidewall, and a rotor magnet coupled with the sidewall along a second surface of the rotor sidewall opposite the first surface. The stator includes a plurality of stator magnets circumferentially arranged along a surface of a stator sidewall facing the second surface of the rotor sidewall, and a controller wirelessly coupled to the plurality of stator magnets, the controller controlling the plurality of stator magnets to selectively produce a respective magnetic field interacting with the rotor magnet of the rotor to rotate the rotor and the rotor blade about the rotational axis to produce lift along the rotational axis.

At least one aspect relates to a system. The system includes a rotor and a stator. The rotor includes a rotor sidewall defining a rotational axis, at least one rotor blade coupled with and transverse the sidewall along a first surface of the side wall, and a rotor magnet coupled with the sidewall along a second surface of the rotor sidewall opposite the first surface. The stator includes a plurality of stator magnets circumferentially arranged along a surface of a stator sidewall facing the second surface of the rotor sidewall, and a controller electrically coupled to the plurality of stator magnets, the controller controlling the plurality of stator magnets at a switching rate to selectively produce a respective magnetic field, the magnetic fields interacting with the rotor magnet of the rotor to rotate the rotor and rotor blade at a rotational velocity corresponding to the switching rate to produce lift at a lift velocity.

At least one aspect relates to a system. The system includes a rotor configured to rotate about a rotational axis and a stator. The rotor includes a rotor sidewall, at least one rotor blade rotatably coupled with the sidewall along a first surface of the side wall, the at least one rotor blade rotating about a blade axis extending transverse the side wall, and a first rotor magnet and a second rotor magnet coupled with the sidewall along a second surface of the rotor sidewall opposite the first surface. The stator includes a plurality of first stator magnets circumferentially arranged along a stator sidewall facing the rotor sidewall, at least one of the plurality of first stator magnets proximate to the first rotor magnet, a plurality of second stator magnets spaced from respective first stator magnets and circumferentially arranged along the stator sidewall, at least one of the plurality of second stator magnets proximate to the second rotor magnet, and a magnet controller electrically coupled to the plurality of first stator magnets and the plurality of second stator magnets, the magnet controller controlling the plurality of first stator magnets at a first switching rate and controlling the plurality of second stator magnets at a second switching rate to produce rotation of the rotor blade about the blade axis.

At least one aspect relates to a system. The system includes a stator and a rotor. The stator includes a plurality of stator magnets circumferentially arranged along a surface of the stator. The rotor is configured to rotate about a rotational axis and has an annular rotor base surrounding the stator. The rotor includes a plurality of rotor segments. Each rotor segment includes a sidewall spaced from the rotational axis having a first surface and a second surface opposite the first surface, at least one rotor magnet coupled to the side wall along the first surface, the rotor configured to be driven by the plurality of stator magnets via respective magnetic fields of the plurality of stator magnets interacting with the at least one rotor magnet, and at least one rotor blade having a first blade end coupled with the second surface of the sidewall and a second blade end, the first end and second defining a rotor blade length, the second end and rotational axis defining a radius of rotation, a ratio of the rotor blade length to the radius of rotation of the tip being less than or equal to 0.75.

At least one aspect relates to a system. The system includes a rotor configured to rotate about a rotational axis and a stator. The rotor includes a rotor sidewall, a first rotor blade rotatably coupled with the sidewall along a first surface of the side wall, the first rotor blade rotating about a first blade axis extending transverse the side wall, a second rotor blade rotatably coupled with the sidewall along the first surface of the sidewall, the second rotor blade rotating about a second blade axis extending transverse the sidewall, a first set of rotor magnets including a first rotor magnet and a second rotor magnet coupled with the sidewall along a second surface of the rotor sidewall opposite the first surface proximate the first rotor blade, and a second set of rotor magnets including a third rotor magnet and a fourth rotor magnet coupled with the sidewall along the second surface of the rotor sidewall proximate the second rotor blade. The stator includes a plurality of first stator magnets circumferentially arranged along a stator sidewall facing the rotor sidewall, at least one of the plurality of first stator magnets proximate to the first rotor magnet and at least one of the plurality of first stator magnets proximate the third rotor magnet, a plurality of second stator magnets spaced from respective first stator magnets and circumferentially arranged along the stator sidewall, at least one of the plurality of second stator magnets proximate to the second rotor magnet and at least one of the plurality of second stator magnets proximate to the fourth rotor magnet, and at least one controller electrically coupled to the plurality of first stator magnets and the plurality of second stator magnets, the at least one controller configured to receive a movement instruction, extract a desired movement from the movement instruction, generate a plurality of control signals based on the desired movement, and provide the plurality of control signals to the plurality of first stator magnets and the plurality of second stator magnets to cause the plurality of first stator magnets and the plurality of second stator magnets to output magnetic fields corresponding to the plurality of control signals that drive the rotor magnets of the rotor to rotate the rotor about the rotational axis, rotate the first rotor blade about the first blade axis, and rotate the second rotor blade about the second blade axis to produce the desired movement.

At least one aspect relates to a rotor for operation with a stator. The rotor includes an annular rotor base defining a rotational axis and comprising a plurality of first rotor segments arranged around the stator and configured to be driven in a first direction about the rotational axis, and a plurality of second rotor segments arranged around the stator adjacent to the plurality of first rotor segments and configured to be driven in a second direction about the rotational axis opposite the first direction, each rotor segment including a sidewall spaced from the rotational axis, a first rotor wall extending from a first end of the sidewall and towards the rotational axis, and a second rotor wall extending from a second end of the sidewall and towards the rotational axis, the second rotor wall spaced from the first rotor wall, the rotor defining a rotor axis through the first rotor wall and the second rotor wall and parallel to the rotational axis, at least one first rotor magnet coupled with the first rotor wall, the at least one first rotor magnet configured to maintain a first space between the first rotor wall and the first stator magnet along the rotor axis, at least one second rotor magnet coupled with the second rotor wall, the at least one second rotor magnet configured to maintain a second space between the second rotor wall and the second rotor magnet along the rotor axis, at least one third rotor magnet coupled with the sidewall and spaced from one or more propulsion magnets of the stator, the rotor configured to be driven by the propulsion magnets via a magnetic field of the one or more propulsion magnets interacting with the at least one third rotor magnet. In some embodiments, the at least one rotor blade is a first rotor blade and the rotor magnet is a first rotor magnet corresponding to the first rotor blade, the first rotor blade configured to rotate about the rotational axis in a first direction, and the rotor includes a second rotor blade spaced apart from the first rotor blade, the second rotor blade coupled with and transverse the sidewall along a first surface of the sidewall, and a second rotor magnet corresponding to the second rotor blade, the second rotor magnet being driven to drive the second rotor blade in a second direction about the rotational axis opposite the first direction.

Those skilled in the art will appreciate that the summary is illustrative only and is not intended to be in any way limiting. Other aspects, inventive features, and advantages of the devices and/or processes described herein, as defined solely by the claims, will become apparent in the detailed description set forth herein and taken in conjunction with the accompanying drawings.

BRIEF DESCRIPTION OF THE DRAWINGS

The foregoing and other objects, aspects, features, and advantages of the disclosure will become more apparent and better understood by referring to the following description taken in conjunction with the accompanying drawings, in which.

DETAILED DESCRIPTION

Figure 1:
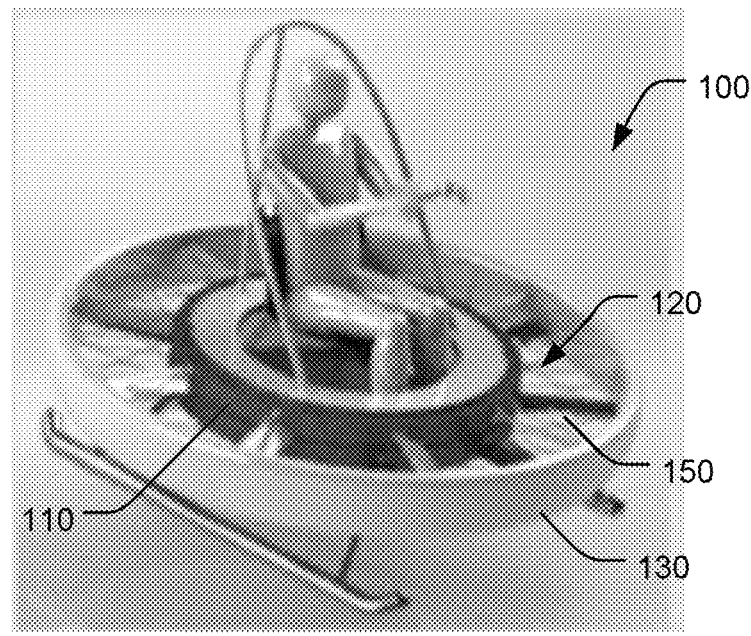
FIG. 1 is a schematic diagram of an embodiment of a VTOL platform.

For purposes of reading the description of the various embodiments below, the following enumeration of the sections of the specification and their respective contents may be helpful:

Section A describes embodiments of systems and methods of a VTOL platform that operates using magnetic levitation;

Section B describes embodiments of systems and methods of levitation and guidance of a VTOL platform that operates using magnetic levitation; and Section C describes embodiments of systems and methods of controlling a VTOL platform that operates using magnetic levitation, including flight dynamics, motor control, and pitch control.

A. Systems and Methods of VTOL Platforms Using Magnetic Levitation

Referring generally to FIGS. 1-5, a VTOL platform in accordance with the present disclosure can use magnetic levitation and specific control mechanisms to efficiently drive a rotor with a stator to enable vertical takeoff and landing, as well as flight control operations such as lift, pitch, roll, and yaw control. The VTOL platform can have improved size, weight, power, and cost (SWAP-C) factors relative to existing systems, including increased power density relative to internal combustion-based systems. The VTOL platform can achieve high rotor rotation rates for an annular platform configuration.

The VTOL platform can have reduced noise relative to existing systems with similar performance capability by reducing both mechanical and aerodynamic noise generation. Existing systems that rely on mechanical operation of gearboxes, swashplates, and generators may generate significant noise. In turbines mechanical noise may be transmitted along the structure of the turbine and radiated from its surfaces, and aerodynamic noise may be produced by the flow of air over the blades. In helicopters, noise may be generated by the main rotor and tail rotor interactions with air. This can be verified by analyzing the frequency spectrum of a helicopter during takeoff: there may be global and local maximas at the respective blade passing frequencies of each rotor blade. There may also be a very large distribution of acoustic power that sweeps over the higher frequencies, and this broadband noise may result from a combination of multiple noise mechanisms, including operation of the turbine, gearbox, and transmission. The present solution can address these noise sources by using a direct electric powertrain that relies on fewer interactions between mechanical components, and also by configuring rotor blades in a manner that reduces noise generation. As such, the present solution can reduce energy inefficiencies associated with noise generation, as well as nuisances associated with noise that make existing systems less viable for urban environment and personal use modes.

In some embodiments, the VTOL platform includes a rotor, a stator, a flight controller, and a motor controller. The rotor includes a plurality of rotor blades oriented about a rotor axis and radially spaced from the stator. Each rotor blade is coupled to a rotor arm such that rotation of the rotor arm causes the rotor blade to rotate about a rotor pitch axis. The rotor arm is coupled to a first rotor magnet spaced from a second rotor magnet. The stator includes a plurality of electromagnets. The flight controller is configured to receive a movement instruction, extract a desired movement from the movement instruction, and generate one or more flight commands configured to cause the rotor to generate at least one of thrust, moment of force about a yaw axis, moment of force about a platform pitch axis, or moment of force about a platform roll axis. The motor controller is configured to receive the one or more flight control commands and drive electrical signals through the electromagnets based on the one or more flight control commands. The plurality of electromagnets are configured to output electromagnetic fields corresponding to the electrical signals to drive the rotor magnets of the rotor to rotate the rotor about the rotor axis, rotate the rotor blade about the blade neutral pitch axis, and cause the rotor to generate the at least one of the thrust, the moment of force about the yaw axis, the moment of force about the platform pitch axis, or the moment of force about the platform roll axis.

Figure 2:
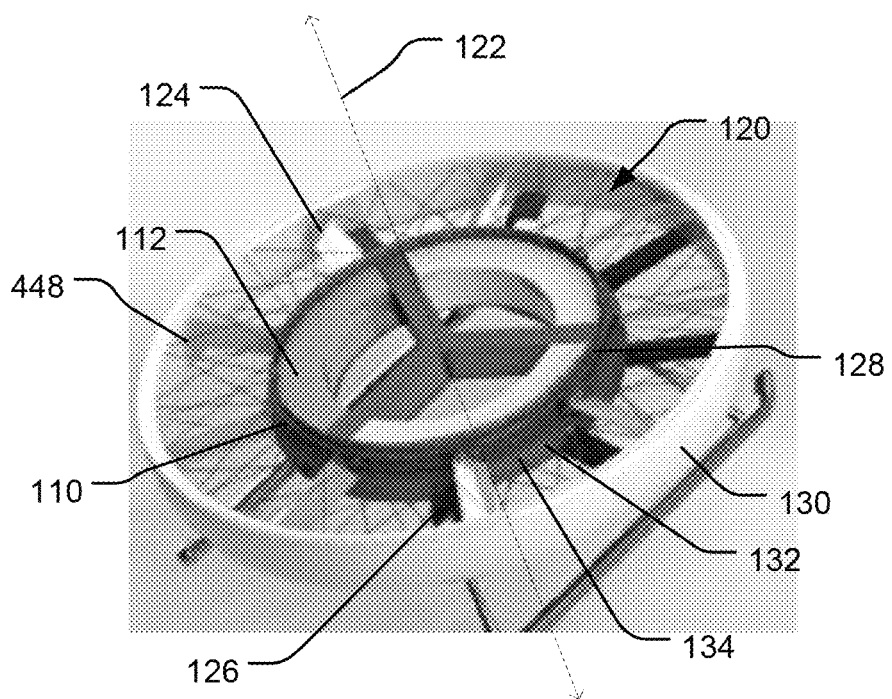
FIG. 2 is a schematic diagram of a portion of the VTOL platform of FIG. 1.

Referring now to FIGS. 1-2, a VTOL platform 100 includes a stator 110 that drives a rotor 120. The rotor 120 can extend from the stator 110 to a housing 130 (e.g., a nacelle). A support structure 140 can be mounted to the stator 110, such as to provide a seat 142 for an operator 144 of the VTOL platform 100. While FIGS. 1-2 illustrate the stator 110 inward of the rotor 120, the stator 110 may be outward from the rotor 120. The rotor 120 can be supported by a levitation system (e.g., levitation system 360 described with reference to FIG. 3) coupled to the stator 110 to rotate about the stator 110. The stator 110 and rotor 120 can include various magnets (e.g., permanent magnets; electromagnetic coils; electromagnetic coils through which current can be driven to cause the electromagnetic coils to generate magnetic fields).

The stator 110 can use power from a power supply 112 to drive the rotor 120 by outputting electromagnetic fields to drive magnets of the rotor 120, including to rotate the rotor 120 about a rotational axis 122. For example, the stator 110 can drive the rotor 120 based on control signals received from a controller, as discussed further herein. The power supply 112 can include one or more batteries. The power supply 112 can be highly distributed and integrated into the support structure 140, which can improve stiffness and reduce weight of the VTOL platform 100 as compared to existing systems.

The stator 110 can have increased efficiency relative to existing mechanical systems. Using an electromagnetic coupling between the stator 110 and rotor 120, rather than mechanical connections, can improve operation relative to existing systems. In order to achieve a VTOL platform having similar performance parameters as can be enabled by the present solution in existing systems would require the engine to drive small gears spinning much faster than a large radius rotor, which could result in significant mechanical friction losses, and would weigh significantly more than a simple rotor mounted to a driven axle. In such existing systems, there could be large efficiency losses due to the extreme gear ratio, large inherent manufacturing difficulties from the large geared and/or toothed ring structures, loud mechanical interactions outweighing any aeroacoustic benefits of the annular rotor geometry, and/or large, heavy structures used for power transfer that could increase total weight significantly. The present solution can address such phenomena by using the stator 110 to drive the rotor 120—in some embodiments, the present solution can produce a distributed torque through the use of a power dense, efficient and responsive electric synchronous motor, rather a gearbox or axle for torque transfer as the rotor-ring, and can simultaneously act as the electromechanical rotor, drive axle, and blade hub, thus lowering weight, efficiency losses, and mechanical complexity.

Further with respect to the stator 110 and rotor 120, it has been found that motor power density increases linearly with hub radius, and decreases linearly with motor height. The present solution can implement such features to configure the stator 110 to have a relatively large radius and relatively low thickness to increase efficiency and power density, enabling the stator 110 to have less mass and/or greater power output relative to existing internal combustion-based systems.

Figure 4:
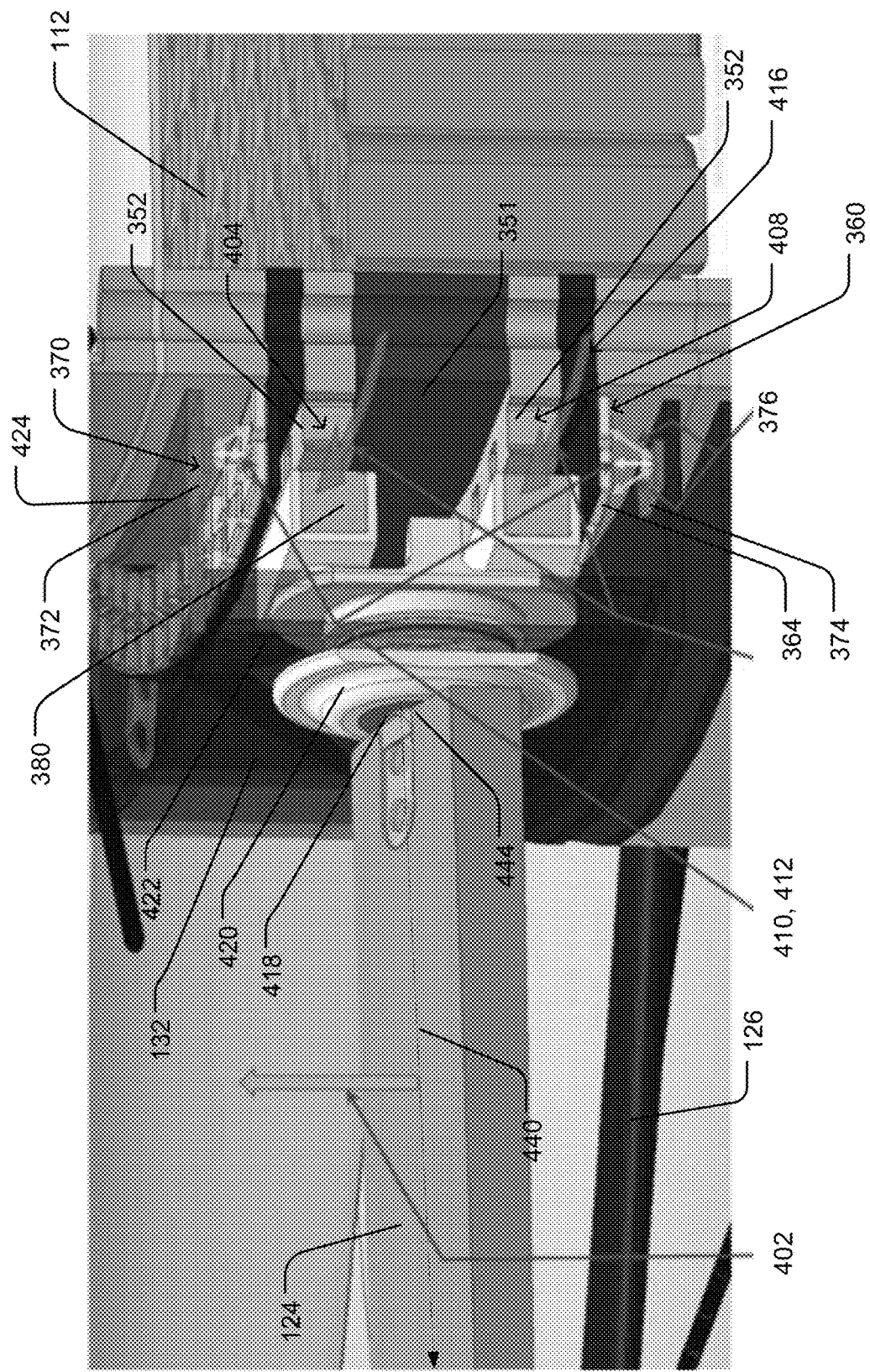
FIG. 4 is a partial perspective view of a motor region of the VTOL platform of FIG. 1.

The rotor 120 is shown as an annular rotor that can orbit about the stator 110 and support structure 140. The rotor 120 includes a plurality of first blades 124 (coupled to respective magnets as discussed further herein). The plurality of first blades 124 can extend between the stator 110 and the housing 130. In some embodiments, the stator 110 controls a pitch angle of each first blade 124. The first blades 124 can be coupled with and transverse to (e.g., perpendicular to) sidewall 134. As illustrated in FIGS. 1 and 4, each first blade 124 can extend from a first blade end (e.g., blade root) 444 coupled with the sidewall 134 (e.g., rotor segments 132 of sidewall 134) to a second blade end (e.g., blade tip) 448, which can be coupled with the housing 130 or free from the housing 130. The first blade 124 can define a blade axis 440 extending from the first blade end 444 to the second blade end, which can be perpendicular to the rotational axis 122.

In some embodiments, the rotor 120 includes a plurality of second blades 126, which can be similar to the first blades 124 and may rotate about the rotational axis 122 independently relatively to the plurality of first blades 124. The second blades 126 can be spaced from the first blades 124, such as being coupled with the sidewall 134 (e.g., rotor segments 132 of sidewall 134) below the first blades 124, or coupled with a second sidewall 134 below the first blades 124.

By rotating the first blades 124 and/or second blades 126, the VTOL platform 100 can generate lift due to action of the first blades 124 and/or second blades 126 on air passing through the VTOL platform 100. Similarly, the first blades 124 and/or second blades 126 can be driven in a manner to cause rotation about yaw, roll, and/or pitch axes.

The rotor blades 124, 126 can be individually feathered (e.g., blade surfaces aligned at a particular angle relative to direction of airflow) to maintain cyclic and collective pitch commands for guidance of the VTOL platform 100. As compared to existing systems, in which a swashplate may be used to control operation of rotor blades, the present solution can individually control pitch of each rotor blade 124, 126 in a frictionless manner.

Systems and Methods for Controlling Lift Using Contra-Rotating Rotors

In some embodiments, the plurality of first blades 124 rotate in a first direction about the rotational axis 122, while the plurality of second blades 126 rotate in a second direction about the rotational axis 122 opposite the first direction. As such, the plurality of first blades 124 and plurality of second blades 126 can be contra-rotating. For example, each second blade 126 can be coupled with respective rotor magnets 380 that are driven by the stator 110 in the second direction. As discussed further herein, the control circuit 310 can control operation of the plurality of first blades 124 by providing a first control signal to cause the plurality of first blades 124 to rotate about the rotational axis 122 in the first direction at a first angular rate, and control operation of the plurality of second blades 126 by providing a second control signal to cause the plurality of second blades 126 to rotate about the rotational axis 122 in the second direction at a second angular rate. The control circuit 310 can generate the first control signal and second control signal to generate a desired motion of the VTOL platform 100. For example, to enable the VTOL platform 100 to operate in a hover mode, the control circuit 310 can generate the first control signal and second control signal so that the first angular rate and second angular rate are configured so that a force balance on the VTOL platform 100 is zero in at least a vertical direction (e.g., upward force generated by the plurality of first blades 124 counteracts gravity and downward force generated by the plurality of second blades 126).

Systems and Methods for Reducing Noise Based on Effective Rotor Area Relative to a Center of Rotation In some embodiments, the rotor blades 124, 126 are configured to enable a relatively lower acoustic profile, such as to generated reduced noise while generating sufficient lift to support movement of the VTOL platform 100. In the present solution, the number of rotor blades 124, 126 can be selected to be relatively high, with the blades having phase modulated spacing, to reduce noise while lift is maintained. Each blade 124, 126 may have a relatively large tip diameter. The rotor blades 124, 126 may be positioned and aligned relative to one another to operate incoherently. As such, noise resulting from interaction of the rotor 120 and surrounding fluid can be reduced. In some embodiments, the rotor blades 124, 126 have a maximum tip Mach number of 0.5, and a hover tip Mach number of 0.41. In some embodiments, the rotor blades 124, 126 are at least one of ducted or shrouded, which can increase lift generation, improve safety, and reduce noise radiated from the rotor blades 124, 126. In some embodiments, the housing 130 is shaped to reflect noise upwards, and may also attenuate noise travelling outward from the rotor 120.

In some embodiments, the rotor blades 124, 126 have a relatively short length relative to a radius of rotation of the second blade end 448. For example, the rotor blades 124, 126 can define a rotor blade length from the first blade end 444 to the second blade end 448 along the blade axis 440 (e.g., from the blade root to the blade tip). The second blade end 448 can define a radius of rotation from the second blade end 448 to the rotational axis 122. The rotor blades 124, 126 can define a ratio of the rotor blade length to the radius of rotation. In some embodiments, the ratio is less than or equal to 0.75. In some embodiments, the ratio is less than or equal to 0.6 and greater than or equal to 0.3. For example, as illustrated in FIG. 2, the rotor blades 124, 126 begin outward of the rotational axis 122. In some embodiments, the efficiency of a rotor blade in generating lift as a function of distance from a center of rotation (e.g., from rotational axis 122) is generally higher towards the blade tip than the blade root. As such, the present solution can reduce noise with relatively less performance loss by selecting blades that operate primarily in the high efficiency region.

In some embodiments, the rotor blades 124, 126 have a relatively high blade effective area or blade solidity. The second blade end 448 can define a first perimeter (e.g., a perimeter swept by the second blade end 448 as the second blade end 448 rotates about the rotational axis 122). The sidewall 134 (or the first blade end 444) can define a second perimeter, which is inward of the first perimeter. The rotor blades 124 and/or 126 can also define a blade rotation area in a first plane between the first perimeter and the second perimeter (e.g., a first plane in which the first perimeter and second perimeter lie). The blade rotation area can represent the area swept by the first rotor blade 124 in the first plane as the first rotor blade 124 rotates about the rotational axis 122. The rotor blades 124 and/or the rotor blades 126 can define a blade surface area in the first plane, which can represent a surface area of the rotor blades 124 and/or the rotor blades 126 that lies in the first plane (while the rotor blades 124 or the rotor blades 126 are steady or not moving). The plurality of first rotor blades 124 (or the plurality of second rotor blades 126) can define a blade effective area as a ratio of the blade surface area to the blade rotation area. In some embodiments, the blade effective area is greater than or equal to 0.4 (e.g., as compared to 0.2 in many existing systems). In some embodiments, the blade effective area is greater than or equal to 0.6. By having an increased blade effective area, the rotor blades 124, 126 can more efficiently generate lift at lower speeds and pitches; the VTOL platform 100 can achieve greater blade effective areas by using frictionless methods for driving rotation of the rotor 120, which would otherwise not be possible using mechanical couplings, such as swashplates and gearboxes, to rotate the rotor 120 (or would result in increased mechanical noise that would offset noise reductions from increased blade effective area).

The VTOL platform 100 can include a plurality of beams 150 extending from the support structure 140 to the housing 130. The beams 150 can be unidirectional carbon fiber spokes. The beams 150 can be swept and leaned to increase a number of incident wakes from the rotor blades 124, 126 acting on each beam 150, spreading the phase angle of the wakes to achieve incoherence. The beams 150 can provide radial, vertical, and torsional stiffness to keep the housing 130 secure with respect to the support structure 140.

Figure 3:
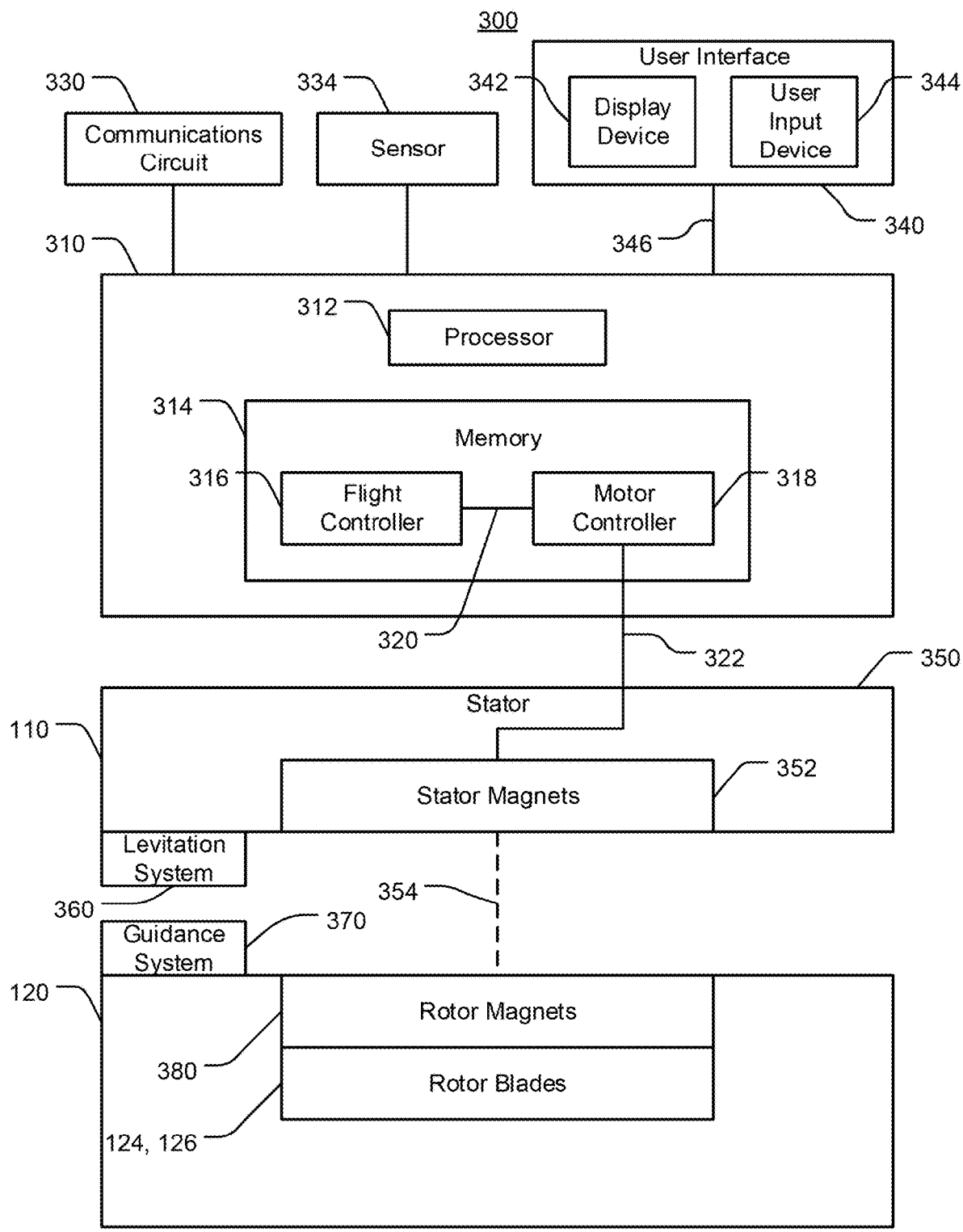
FIG. 3 is a block diagram of various systems of the VTOL platform of FIG. 1.
Figure 5:
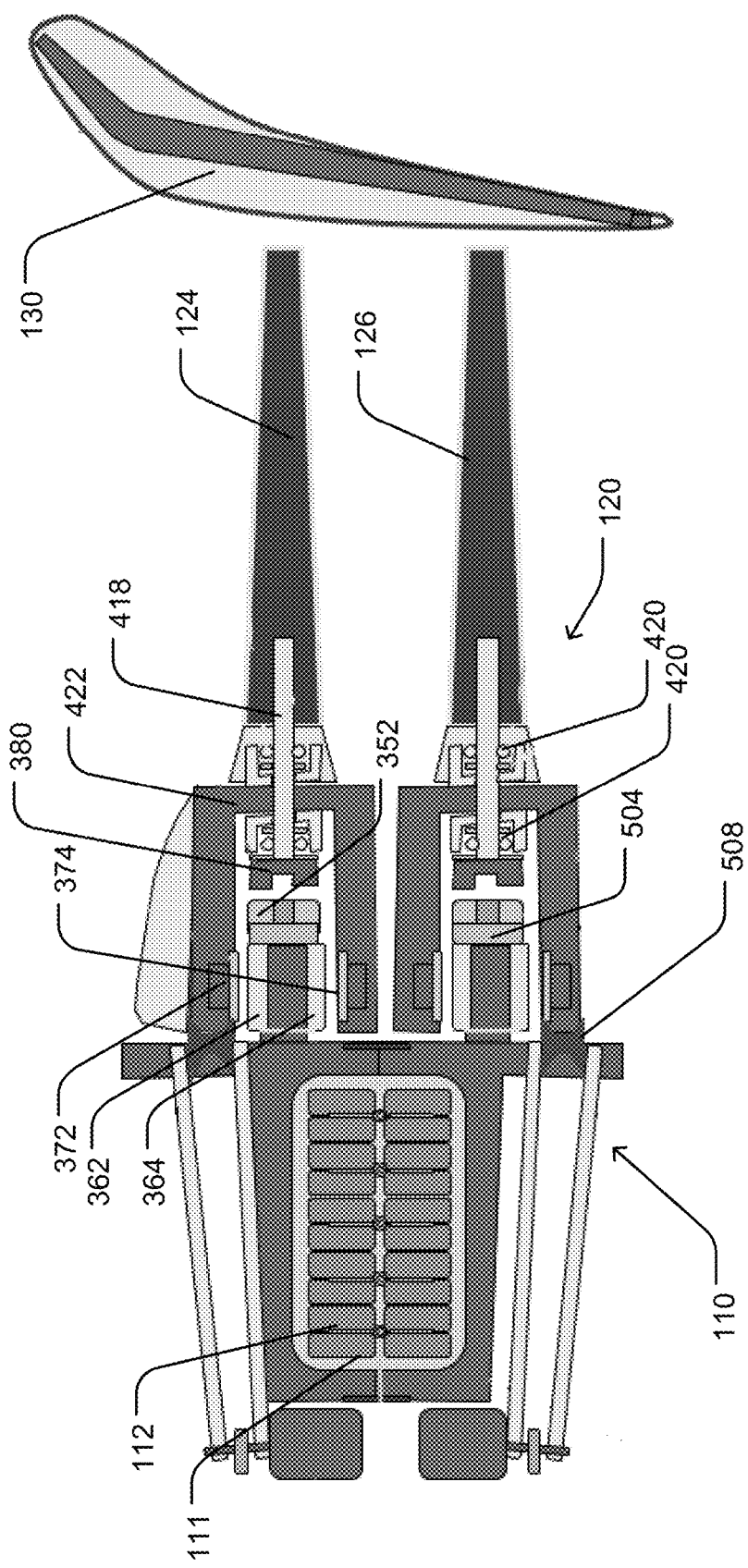
FIG. 5 is a section view of the motor region of the VTOL platform of FIG. 1.

Referring now to FIGS. 3-5, a VTOL system 300 includes a control circuit 310, the stator 110, and the rotor 120. The VTOL system 300 can be implemented to control operation of the VTOL platform 100 described with reference to FIGS. 1-2. The control circuit 310 includes a processor 312 and memory 314. The processor 312 may be implemented as a specific purpose processor, an application specific integrated circuit (ASIC), one or more field programmable gate arrays (FPGAs), a group of processing components, or other suitable electronic processing components. The processor 312 may be a distributed computing system or a multi-core processor. The memory 314 is one or more devices (e.g., RAM, ROM, flash memory, hard disk storage) for storing data and computer code for completing and facilitating the various user or client processes, layers, and modules described in the present disclosure. The memory 314 may be or include volatile memory or non-volatile memory and may include database components, object code components, script components, or any other type of information structure for supporting the various activities and information structures of the inventive concepts disclosed herein. The memory 314 is communicably connected to the processor 312 and includes computer code or instruction modules for executing one or more processes described herein. The memory 314 can include various circuits, software engines, and/or modules that cause the processor to execute the systems and methods described herein. The memory may be distributed across disparate devices.

The memory 314 includes a flight controller 316 and a motor controller 318. The flight controller 316 can use flight dynamics models, rotor state, and control laws to convert desired movement of the VTOL system 300 into flight control signals 320, and transmit the flight control signals 320 to the motor controller 318. The motor controller 318 can receive the flight control signals 320, and generate motor control signals 322 based on the flight control signals 320 to control operation of the stator 110, in order to cause the VTOL platform 100 to achieve the desired movement.

The VTOL system 300 can include a communications circuit 330. The communications circuit 330 is configured to receive and transmit data. The communications circuit 330 can include receiver electronics and transmitter electronics. The communications circuit 330 can include a radio configured for radio frequency communication. The communications circuit 330 can include a datalink radio. The communications circuit 330 can receive and transmit navigation information from/to remote platforms.

The VTOL system 300 can include at least one sensor 334. The at least one sensor 334 can provide sensor data to the control circuit 310. The at least one sensor 334 can detect position, speed, acceleration, altitude, orientation, and other state parameters of VTOL system 300 (e.g., of the VTOL platform 100 implementing the VTOL system 300). The at least one sensor 334 can detect environmental parameters such as temperature, air pressure, and wind speed. The at least one sensor 334 may include at least one of an inertial measurement unit (which may include one or more gyroscopes and one or more accelerometers, such as three gyroscopes and three accelerometers), an air data sensor (e.g., sensor(s) configured to detect and output an indication of static pressure), or a magnetic compass. The at least one sensor 334 can include a global navigation satellite system (GNSS) receiver and/or a global positioning system (GPS) receiver.

The VTOL system 300 can include a user interface 340 including a display device 342 and a user input device 344. The display device 342 can receive display data from control circuit 310 and present the received display data. The display device 342 can include various display components, including but not limited to CRT, LCD, organic LED, dot matrix display, and others. The display device 342 may include navigation displays, primary flight displays, electronic flight bag displays, tablets such as iPad® computers manufactured by Apple, Inc. or tablet computers, synthetic vision system displays, HUDs with or without a projector, head up guidance systems, wearable displays, watches, Google Glass® or other HWD systems. The display device 342 can present display data such as air traffic control data, weather data, navigation data (e.g., flight plans), and terrain information.

The user input device 344 may include, for example, dials, switches, buttons, touch screens, keyboards, a mouse, joysticks, cursor control devices (CCDs). The user input device 344 may include a touch interface provided by one or more components of the display device 342. The user input device 344 may include an audio input device configured to receive audio information (e.g., spoken information from an operator) that the control circuit 310 can process. The user input device 344 may include an image capture device, such that the control circuit 310 can execute image processing functions such as gesture control, head-tracking, and/or eye-tracking, and generate control instructions based on the image processing.

The user interface 340 can receive a user input, and transmit an indication of the user input 346 to the flight controller 316. The flight controller 316 can receive the indication of the user input 346, extract an input command from the indication of the user input 346, and determine a desired movement of the VTOL platform 100 based on the input command in order to generate the flight control signals 320.

Improved Stator Assembly for Use with a Rotor

The stator 110 includes a stator housing 350 (e.g., an annular stator base) supporting a plurality of stator magnets 352 (e.g., propulsion magnets). The stator housing 350 can include a plurality of stator segments 351, which can be contiguous, such as being integral or monolithic, or can be at least partially disconnected, such as by being separate members or being connected by extensions that are narrower than the adjacent stator segments 351. The plurality of stator magnets 352 can each be driven by the motor control signals 322. The plurality of stator magnets 352 can be electromagnets. For example, the plurality of stator magnets 352 can include electromagnetic coils that output electromagnetic fields based on electrical signals driven through the electromagnetic coils. The electromagnet coils may be made from various conductive materials, including aluminum or copper. In some embodiments, aluminum can be used based on being light weight, having high thermal conductivity, and having an electrical conductivity more than twice that of copper as a function of mass (e.g., aluminum can be selected that has 61 percent of the conductivity of copper but 30 percent of the mass of copper for a given volume, enabling mass savings offsetting the volume increase to achieve a same amp rating). The stator 110 can include a laminated iron core 504 adjacent to the stator magnets 352, which can increase a magnitude of the magnetic field outputted by the stator magnets 352.

In response to receiving a particular motor control signal 322, each stator magnet 352 can output a corresponding electromagnetic field 354. Each stator magnet 352 can vary a magnitude of the outputted electromagnetic field 354 as a function of time depending on the received motor control signal 322. For example, if the motor control signal 322 has varying values of parameters such as amplitude and frequency, amplitude and frequency of the electromagnetic field 354 can similarly vary.

As described further herein, the stator 110 can include magnets 362a, 362b, 364a, and 364b of LGS 360 that can interact with rotor magnets 372, 374 to maintain respective spaces between the stator 110 and the rotor 120 and in turn receive lift from the rotor 120 to lift the stator 110. For example, as the stator magnets 352 output electromagnetic fields 354, lift generated by rotation of the rotor 120 can cause the rotor 120 to move upwards (e.g., closer to magnet 372 and further from magnet 374); as a result, the rotor 120 applies force via the magnets 372, 374 on the stator 110, lifting the stator 110 as operation of the magnets 362a, 362b, 364a, and 364b adjust to the forces applied by the rotor 120 and transfer the forces to the stator housing 350.

Improved Rotor Assembly for Use with a Stator

The rotor 120 includes a rotor base 128. The rotor base 128 can be annular, extending around the rotational axis 122 and defining a space between the rotor base 128 and the stator housing 350. The rotor base 128 can include a plurality of rotor segments 132. Each rotor segment 132 can include a sidewall 134 spaced from the rotational axis 122. The rotor segments 132 can be contiguous, such as by each rotor segment 132 being connected with adjacent rotor segments 132 or being integral or monolithic. The rotor segments 132 can be at least partially disconnected, such as by being separate members or being connected by extensions that are narrower than the adjacent rotor segments 132 in a direction perpendicular to the rotational axis 122.

The rotor 120 includes a plurality of rotor magnets 380 arranged around the rotor 120. One or more rotor magnets 380 can be coupled with corresponding sidewalls 134. Each rotor magnet 380 can be driven by corresponding electromagnetic fields outputted by the plurality of stator magnets 352. The plurality of rotor magnets 380 can be permanent magnets, which may have a higher flux density than superconducting magnets for the form factors of the present solution. In some embodiments, the plurality of rotor magnets 380 (and, in some embodiments, the magnets 372 of the LGS 360 described below) include neodymium permanent magnets, which may have magnetic field strengths of up to 1 Tesla, and can be geometrically configured into Halbach arrays to increase the magnetic field strength up to 1.4 T. The time-varying nature of the electromagnetic fields 354 generated by the plurality of stator magnets 352, along with the positioning of the stator magnets 352, can drive the plurality of rotor magnets 380 to rotate about a rotor axis (e.g., rotational axis 122 shown in FIG. 2).

Each rotor blade 124, 126 can be mechanically coupled to at least one rotor magnet 380. In some embodiments, as the rotor magnets 380 rotate, the rotor magnets 380 can be differentially driven about the rotational axis 122 by propulsion 416 caused by the stator 110, the rotor blades 124, 126 will rotate about a pitch axis. As shown in FIG. 4, as the rotor blades 124, 126 rotate, lift 402 can be generated. A castor wheel 508 (e.g., rubber, nylon castor wheel) can be positioned between the stator 110 and rotor 120 to enable the rotor 120 to be supported and continue to rotate relative to the stator 110 when the rotor 120 is at rotating below a speed threshold at which the rotor 120 generates sufficient lift that, when combined with levitation from the levitation system 360, overcomes gravity to levitate the rotor 120. The castor wheel 508 can extend between the stator 110 and the rotor 120 to separate the stator 110 and the rotor 120.

The rotor blades 124, 126 can be made of a composite construction. The composite fiber skin of the blades 124, 126 can transfer the centrifugal and bending loads of the blades 124, 126 to an axle 418 (e.g., a feathering grip axle). In some embodiments, the axle 418 is resisted against the centrifugal and aerodynamic loads by a pair of thrust bearings 420, which can include brass bushings to compensate for the primary bending and shear moments of the rotor blades 124, 126. The rotor 120 can include a support ring 422, which can be a modular assembly of a box hoop mounting the blade assemblies (e.g., each blade 124, 126 and corresponding axle 418 and bearings 420) and driving magnets 380. The support ring 422 can include hollow disks end plates 424 to hold magnets 372, 374.

B. Systems and Methods of Levitation and Guidance of a VTOL Platform

Figure 6:
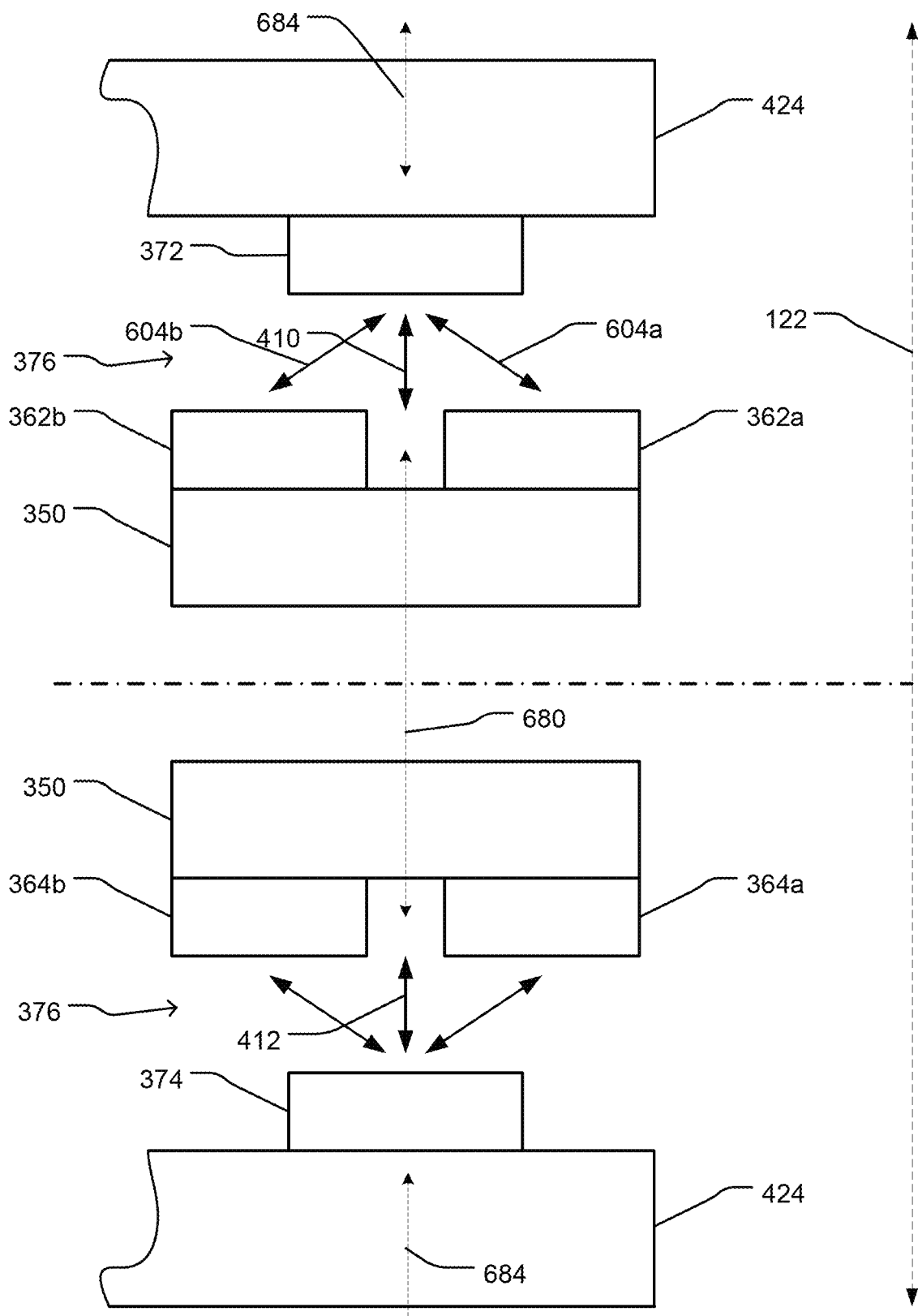
FIG. 6 is a schematic diagram of an embodiment of levitation and guidance systems.

Referring further to FIGS. 3-5 and now to FIG. 6, the VTOL system 300 includes a levitation and guidance system (LGS) 360, which maintains a position (and orientation) of the rotor 120 relative to the stator 110, including to enable the stator 110 to receive lift from the rotor 120 across an air gap between the rotor 120 and stator 110 in order to move the VTOL platform 100.

Systems and Methods for Maintaining Levitation of a Rotor Relative to a Stator

The present solution can maintain levitation of a rotor (e.g., rotor 120) relative to a stator (e.g., stator 110). In implementations in which the stator drives a rotor, the rotor may be needed to be spaced apart from the stator (e.g., to limit friction, for instance). The implementations and embodiments described herein space apart the rotor from the stator even where the stator and rotor are levitating off the ground.

In some embodiments, a system includes a rotor and a stator. The rotor includes a sidewall and two rotor walls extending from the two ends of the sidewall such the two rotor walls are spaced apart from each other. The rotor includes a first and second rotor magnet coupled with the respective rotor walls. The stator includes a support structure extending between the rotor walls. The stator includes a stator magnet (e.g., a first stator magnet) coupled to a first surface of the support structure adjacent to one of the rotor magnets (e.g., the first rotor magnet). The first rotor magnet induces a current in the first stator magnet corresponding to a distance between the first stator magnet and the first rotor magnet. The stator includes another stator magnet (e.g., a second stator magnet) coupled to a second surface of the support structure adjacent to the second rotor magnet. The stator magnets are electrically coupled to one another such that the second stator magnet receives current from the first stator magnet. The second stator magnet outputs a magnetic field having a magnetic field strength based on the current from the first stator magnet. The magnetic field from the second stator magnet interacts with the second rotor magnet to control a distance between the at least one second stator magnet and the at least one second rotor magnet.

For example, referring still to FIGS. 3-5 and 6, the LGS 360 can maintain a position of the rotor 120 along the rotational axis 122 (e.g., vertically) relative to the stator 110. For example, the LGS 360 can include a plurality of first magnets 362 and a plurality of second magnets 364 (also referred to herein as stator magnets) that are passive electromagnetic coils and electrically coupled, such that a total magnetic flux through the first magnets 362 and corresponding second magnets 364 is zero (e.g., the LGS 360 establishes a null flux condition). The magnets 362, 364 may be coupled with respective surfaces of a support structure 510 of the stator 110 which extends between rotor walls 512, 514 and adjacent a sidewall 516 of the rotor 120. The magnets 362, 364 may be arranged along a stator axis.

As the rotor 120 rotates (e.g., due to the magnet 352 coupled to the support structure of the stator 110 driving the magnet 380 coupled to the sidewall 516 of the rotor 120), the blades 124, 126 generate lift 402. The LGS 360 receives the lift via the first magnets 362 as the rotor 120 moves vertically along the rotor axis 122, and transfers the lift to the stator housing 350, causing the VTOL platform 100 to be lifted. The LGS 360 stabilizes the position of the rotor 120 in a direction perpendicular to the rotor axis 122. For example, as a portion of the rotor 120 moves closer to or further from the stator 110, the LGS 360 will pull or push the rotor 120 back to an equilibrium position.

As the rotor 120 rotates and is lifted due to lift 402 generated by rotor blades 124, 126, magnets 372, 374 (also referred to herein as rotor magnets) which are coupled with respective rotor walls 512, 514 of the rotor 120 will output magnetic fields 410, 412 that apply respective forces on the magnets 362, 364. The magnets 372, 374 may be permanent magnets. The magnets 372, 374 may be arranged along a rotor axis extending parallel to the rotational axis of the rotor 120. In some embodiments, magnet(s) 372 and magnet(s) 362 may be aligned, and magnet(s) 374 and magnet(s) 364 may be aligned. In some implementations, the rotor axis may be aligned with the stator axis such that each of magnets 362, 364, 372, 374 are aligned.

The magnitude of the force associated with magnetic field 410 will increase as third magnets 372 move closer to the plurality of first magnets 362, while the magnitude of the magnetic field 412 will decrease as fourth magnets 374 move further from the second magnets 364 (or vice versa). The movement of the rotor 120 along the rotor axis 122 may occur due to various phenomena during operation of the VTOL system 300, including but not limited to when rotation of the rotor 120 results in lift 402. In particular, as rotation of the rotor 120 results in lift 402, the rotor 120 will be driven vertically, applying a net vertical force on the stator 110. In some embodiments, because the first magnets 362 are electrically coupled to the second magnets 364, current induced in the first magnets 362 due to the magnetic field 410 increasing in magnitude will be driven to the second magnets 364 (e.g., due to the null flux condition), causing the magnitude of the magnetic field 412 to increase, in turn pulling the fourth magnets 374 closer to the second magnets 364 and thus maintaining a position of the rotor 120 relative to the stator 110 along the rotor axis 122. The repulsive force associated with the stabilization implemented by the LGS 360 can be linear, which can facilitate the stabilization effect.

Systems and Methods for Improved Guidance of a Rotor Relative to a Stator

The present solution can enable improved guidance of a rotor relative to a stator (e.g., rotor 120, stator 110), such as to maintain the rotor in an appropriate position along an axis perpendicular to the rotational axis 122 responsive to the rotor moving closer to or further from the stator. In implementations in which the stator drives a rotor, the rotor may have a tendency to laterally shift during rotation (e.g., due to centrifugal and centripetal forces). As a result of such lateral shifts, the rotor and stator may become misaligned, which may cause the system to malfunction or even become inoperable. The implementations and embodiments described herein maintain the position of the rotor with respect to the stator to prevent misalignment.

In some embodiments, a system includes a rotor and a stator. The rotor includes a sidewall and a rotor wall extending from an end of the sidewall. The rotor includes a rotor magnet coupled with the rotor wall. The stator includes a support structure adjacent the rotor wall. The stator includes a first stator magnet and a second stator magnet. The stator magnets are coupled with a surface of the support structure proximate to the rotor magnet. The stator magnets may be electrically coupled to one another. The rotor magnet may induce a current in the first stator magnet corresponding to a magnetic force between the first stator magnet and the rotor magnet. The second stator magnet may receive the current from the first stator magnet to control a magnetic force between the second stator magnet and the rotor magnet.

As shown in FIGS. 4 and 6, the first magnets 362 (e.g., stator magnets) include pairs of first magnets 362, one first magnet 362a radially inward and one first magnet 362b radially outward. The second magnets 364 (e.g., stator magnets) similarly include an inward second magnet 364a and an outward second magnet 364b. In some embodiments, the first magnet 362a is electrically coupled to the first magnet 362b, and the second magnet 364a is electrically coupled to the second magnet 364b, enabling a similar null flux condition as between corresponding magnets 362, 364. At an equilibrium position, the magnets 362a, 364a are inward of the corresponding magnets 372, 374 (e.g., rotor magnets), and the magnets 362b, 364b are outward of the corresponding magnets 372, 374. If the rotor 120 shifts towards the stator 110, the magnitude of magnetic fields 376 will change to counteract the shift. For example, as the rotor 120, and thus magnets 372, 374 shift closer towards the rotor axis 122, the magnets 372, 374 will shift towards the magnets 362a, 364a, and further from the magnets 362b, 364b. As such, a distance between the magnets 372, 374 and magnets 362a, 364a increases. In turn, a magnitude of a first field 604a (e.g., a magnetic force of the first magnetic field 604a) between the magnet 372 and the magnet 362a will increase, while a magnitude of a second field 604b (e.g., a magnetic force of the second magnetic field 604b) between the magnet 372 and the magnet 362b will decrease (similarly for the magnet 374 and magnets 364a, 364b). As the magnitude of the field 604a increases, current is induced in the magnet 362a. Because the magnets 362a, 362b are electrically coupled, changes in induced currents between the magnets 362a, 362b will counteract the movement of the magnet 372, and thus move the rotor 120 back towards the equilibrium position. The induced current between the magnets 362a, 362b, 364a, 364b may control the magnetic force between the magnets 372, 374 and magnets 362a, 362b, 364a, 364b to move the rotor 120 back towards the equilibrium position.

C. Systems and Methods of Controlling a VTOL Platform

Figure 7:
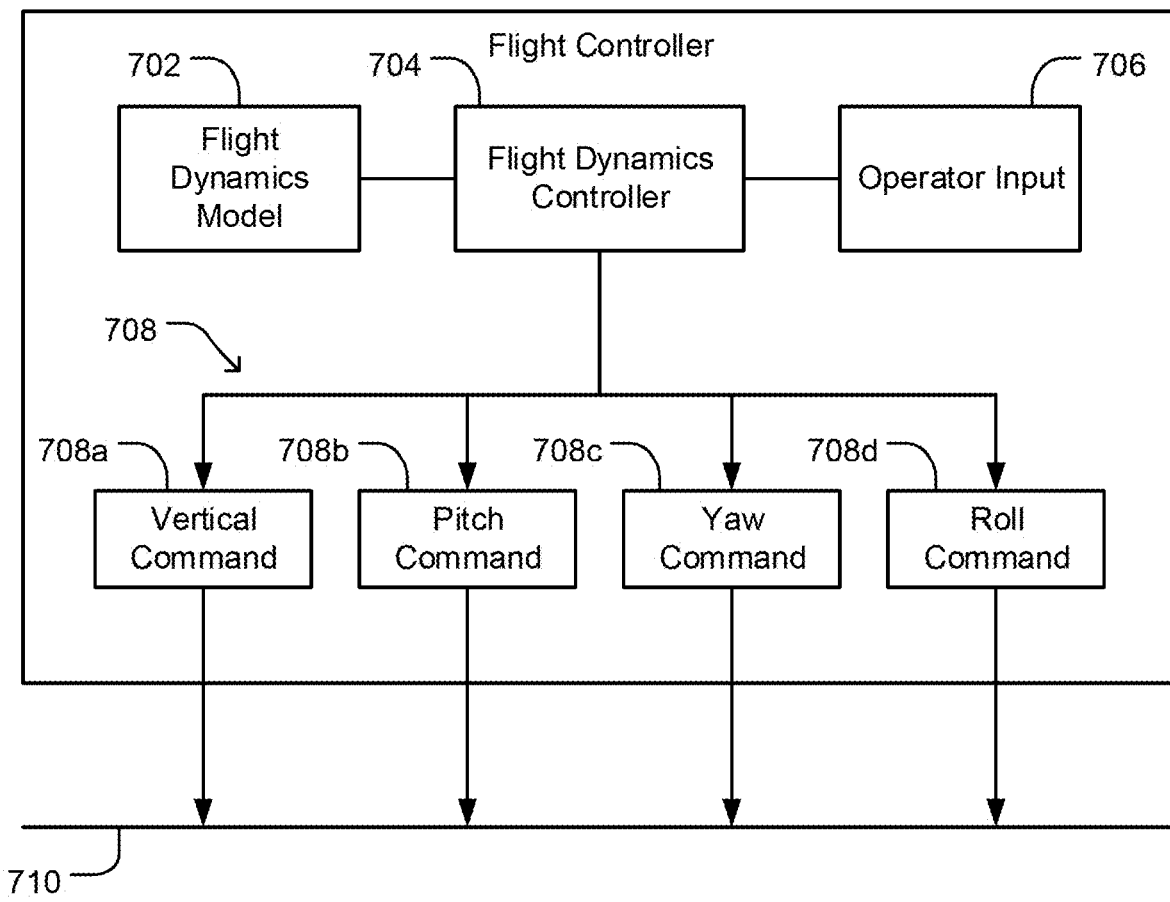
FIG. 7 is a block diagram of an embodiment of a flight dynamics system of a VTOL platform.
Figure 8:
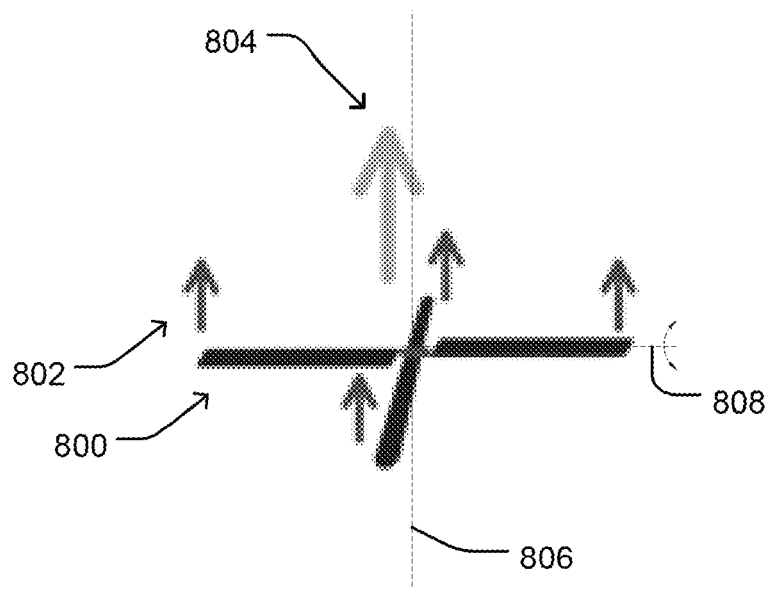
FIG. 8 is a schematic diagram of collective pitch control executed by the flight dynamics system of FIG. 7.
Figure 9:
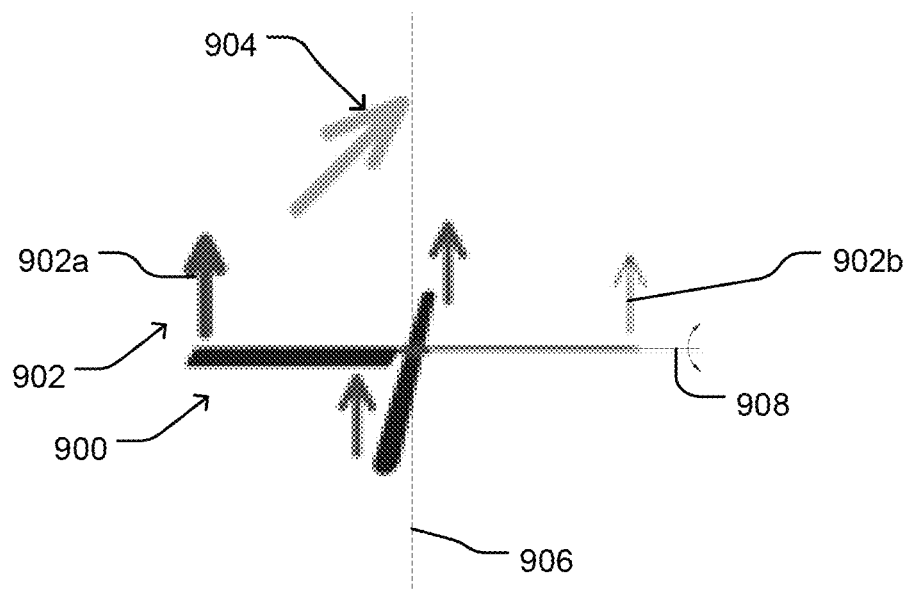
FIG. 9 is a schematic diagram of cyclic pitch control executed by the flight dynamics system of FIG. 7.

Referring now to FIGS. 7-9, a flight controller 700 is shown according to an embodiment of the present disclosure. The flight controller 700 can incorporate features of the flight controller 316 described with reference to FIG. 3, including to generate instructions for controlling motion of a VTOL platform (e.g., VTOL platform 100 described with reference to FIGS. 1-3). For example, the flight controller 700 can generate commands to cause thrust, yaw, pitch, and roll movement of the VTOL platform (e.g., thrust, moment of force about yaw axis, moment of force about platform pitch axis, moment of force about platform roll axis).

Systems and Methods for Drive Control of a Magnetically Levitated Rotor

The present solution can be used to control operation of the rotor 120 to control movement of the VTOL platform 100, such as to cause the rotor 120 to generate lift. In some embodiments, the flight controller 700 includes a flight dynamics model 702. The flight dynamics model 702 can calculate variables associated with motion of the VTOL platform 100. For example, the flight dynamics model 702 can model relationships between thrust, drag, and gravity acting on the VTOL platform 100. The flight dynamics model 702 can calculate lift corresponding to forces acting on the VTOL platform 100. The flight dynamics model 702 can include a function that computes a thrust generated by each rotor blade (e.g., rotor blades 124, 126) based on a pitch angle of each rotor blade; similarly, the flight dynamics model 702 can compute a total thrust generated by all of the rotor blades (e.g., a magnitude and direction of the total thrust) based on the pitch angle of all of the rotor blades.

The flight controller 700 includes a flight dynamics controller 704. The flight dynamics controller 704 can include flight dynamics control laws used to generate control commands 708 to cause the VTOL platform 100 to perform desired movement, such as to selectively control (e.g., via motor controller 1000 and stator system 1100 as described below) the stator magnets 352 to produce respective magnetic fields that interact with rotor magnets 380 to rotate the rotor 120 about the rotational axis 122 to generate lift, and to control operation of the rotor blades 124, 126 to control an angle of the rotor blades 124, 126 about respective blade axes 440. In particular, the flight dynamics controller 704 can generate a vertical command 708a, a pitch command 708b, a yaw command 708c, and a roll command 708d. The flight dynamics controller 704 can generate the commands 708a, 708b, 708c, 708d by mapping pitch angles of each rotor blade to corresponding thrust generated by each rotor blade, and mapping the thrust of each rotor blade to resulting thrust (e.g. total thrust), yaw, pitch, and roll. The flight dynamics controller 704 can generate the command 708b to a moment of force about the yaw axis, the command 708c to a moment of force about the pitch axis, and the command 708d to a moment of force about the roll axis.

The flight dynamics controller 704 can generate the vertical command 708a to indicate a desired vertical motion of the VTOL platform 100. For example, the flight dynamics controller 704 can generate the vertical command 708a to indicate a desired lift to be achieved by the VTOL platform 100.

The flight dynamics controller 704 can generate the vertical command 708a to execute collective rotor pitch control to generate vertical acceleration, such that the upper and lower rotor disks (e.g., upper disk corresponding to rotor blades 124, lower disk corresponding to rotor blades 126, as shown in FIGS. 1-5) can increase or decrease thrust equally to negate yaw torque on a center of the VTOL platform 100. The flight dynamics controller 704 can generate the vertical command 708a to control thrust by collectively changing a pitch angle of each of the rotor blades 124, 126, independent of an angular position of each rotor blade 124, 126 relative to the rotational axis 122.

For example, as shown in FIG. 8, the flight dynamics controller 704 can cause rotor blades 800 (e.g., illustrating an implementation of rotor blades 124 or rotor blades 126) to have a pitch angle resulting in individual thrusts 802 parallel to a rotor axis 806, resulting in total thrust 804 parallel to rotor axis 806. FIG. 8 illustrates each rotor blade 800 having a same pitch angle about respective pitch axes, such as pitch axis 808 illustrated for one of the rotor blades 800.

Systems And Methods for Independent Pitch Control of Rotor Blades of Rotor Assembly to Achieve Directional Control The present solution can be used to independently control the pitch of each rotor blade 800, enabling directional control of the VTOL platform (e.g., control thrust, pitch, yaw, roll). For example, the flight dynamics controller 704 can execute cyclic rotor pitch control to control pitch and roll of the VTOL platform 100. For example, as shown in FIG. 9, the flight dynamics controller 704 can cause a first rotor blade 900 to have a pitch corresponding to a greater thrust 902a than the remaining rotor blades 900, particularly than a lesser thrust 902b of the rotor blade 900 opposite the first rotor blade 900, resulting in a total thrust 904 having a horizontal component relative to rotor axis 906, the horizontal component corresponding to a greater amount of thrust being generated on a first side of the rotor axis 906 where the first rotor blade 900 is located. As will be described with reference to FIGS. 11-12, as the rotor blades 900 rotate about the rotor axis 906, the flight dynamics controller 704 can selectively cause each rotor blade 900 to achieve a desired pitch angle as a function of the position of the rotor blade 900. For example, to achieve the total thrust 904 illustrated in FIG. 9 for a desired duration of time, the flight dynamics controller 704 can generate commands to cause each rotor blade 900 to change its pitch angle through the various pitch angles shown in FIG. 9 as the rotor blades 900 rotate about the rotor axis 906. As discussed further herein, the pitch angle of each rotor blade 900 can be controlled through various mechanisms, such as a motor coupled with the rotor blade 900 to rotate the rotor blade 900 or rotor magnets coupled with the rotor blade 900 that can be driven by stator magnets to rotate the rotor blade 900.

In some embodiments, the flight dynamics controller 704 uses an operator input 706 (which may be received from user interface 340 described with reference to FIG. 3) to generate the control commands 708. For example, the flight dynamics controller 704 can extract movement instructions indicated by the operator input to generate the control commands 708. In some embodiments, the flight dynamics controller 704 uses an autopilot to generate the control commands 708. For example, the autopilot may provide a target destination to the flight dynamics controller 704, such as a waypoint on a flight plan. The autopilot may provide a plurality of target destinations over time to defining a path for the VTOL platform 100 to follow (e.g., a path through a plurality of waypoints).

The flight dynamics controller 704 can use the flight dynamics model 702 to generate the control commands 708. For example, the flight dynamics controller 704 can use the flight dynamics model 702 to calculate a lift expected to be generated by the rotor 120 given pitch angles of the rotor blades. The flight dynamics controller 704 can execute the flight dynamics control laws to convert instructions indicative of desired movement (e.g., instructions extracted via operator input indicating desired movement to a higher altitude at a particular vertical speed and airspeed), and use the flight dynamics model 702 to determine how to control operation of the rotor blades 900 to generate the lift, yaw, pitch, and/or roll expected to achieve the desired movement.

The flight dynamics controller 704 outputs the control commands 708 to a first network 710. The first network 710 can be a communication bus, such as a controller area network (CAN) bus, a local interconnect network (LIN) bus, or a padded jittering operative network (PJON) network. The first network 710 can operate using a micro control stack network stack protocol.

Figure 10:
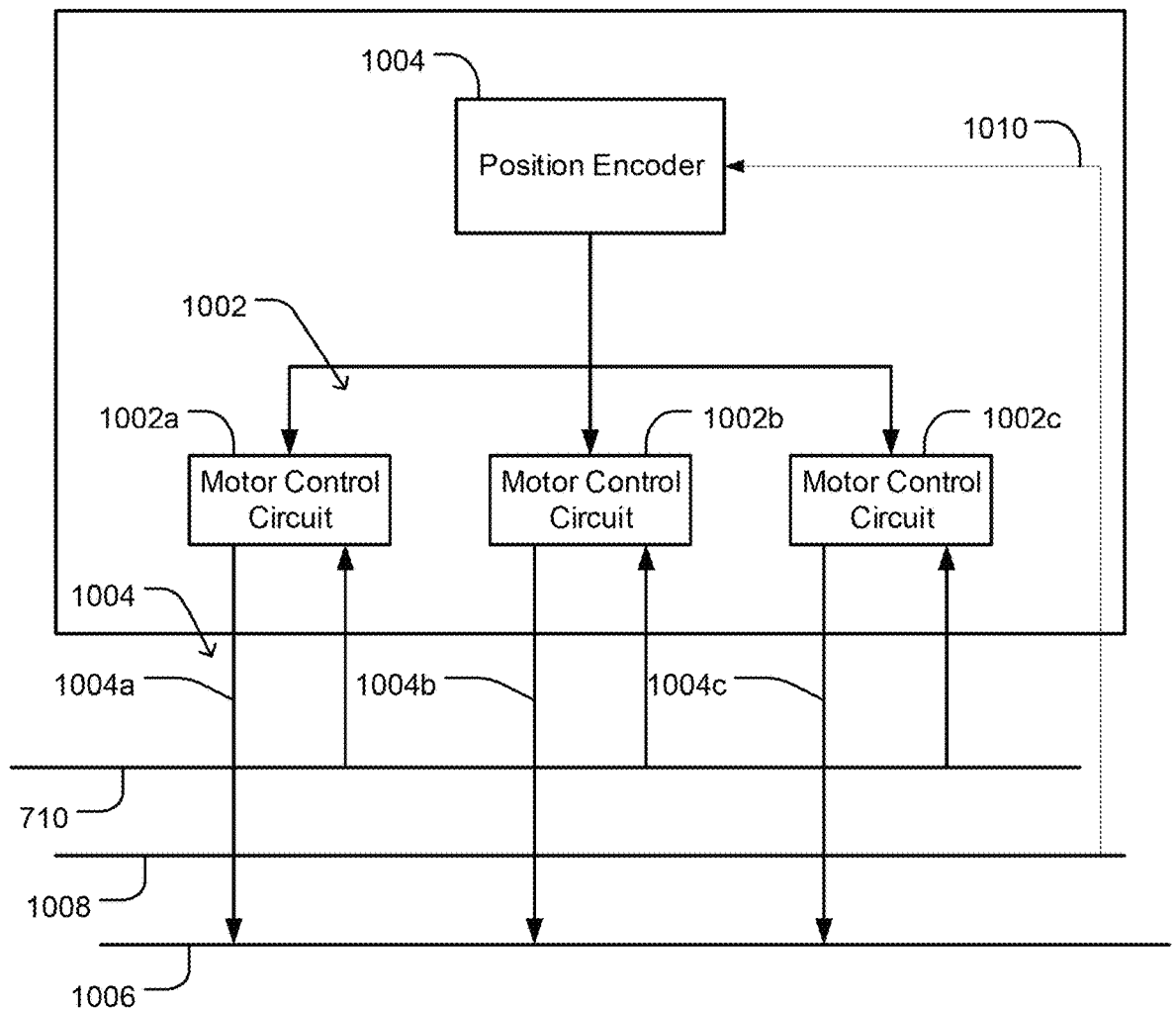
FIG. 10 is a block diagram of an embodiment of a motor controller of a VTOL platform.

Referring now to FIG. 10, a motor controller 1000 is shown according to an embodiment of the present disclosure. The motor controller 1000 can incorporate features of the motor controller 318 described with reference to FIG. 3, including to generate electronic instructions for controlling operation of a stator of a VTOL platform (e.g., stator 110 and VTOL platform 100 described with reference to FIGS. 1-3).

The motor controller 1000 includes at least one motor control circuit 1002. For example, as shown in FIG. 10, the motor controller 1000 includes a first motor control circuit 1002a, a second motor control circuit 1002b, and a third motor control circuit 1002c. The at least one motor control circuit 1002 can receive control commands from the first network 710 (e.g., control commands 708 as described with reference to FIG. 7), and generate motor control signals 1004 to be outputted to the stator 110 via second network 1006. The second network 1006 can be similar to the first network 710.

For example, as shown in FIG. 10, the first motor control circuit 1002a can output first motor control signal 1004a, the second motor control circuit 1002b can output second motor control signal 1004b, and the third motor control circuit 1002c can output third motor control signal 1004c. In some embodiments, the number of motor control circuits 1002 corresponds to the number of phases of operation of magnets of the stator 110; for example, the motor controller 1000 shown in FIG. 10 can be configured for three-phase operation. The motor controller 1000 can execute synchronous control of the stator 110, and can maintain a constant speed of rotation of the rotor 120 by maintaining a source frequency of the motor control signals 1004, including for any load condition that is less than a rated maximum load.

Figure 11:
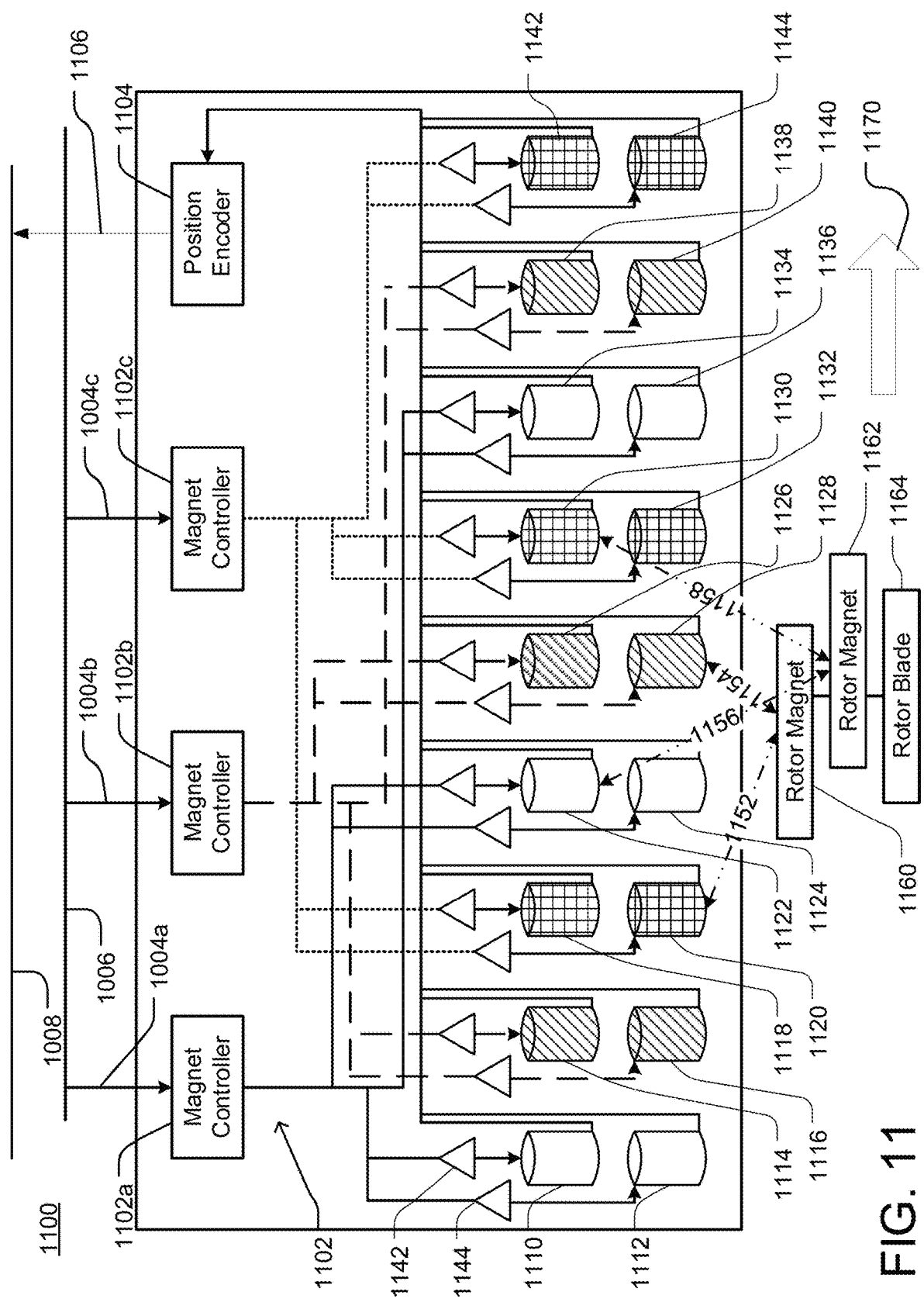
FIG. 11 is a block diagram of an embodiment of a stator of a VTOL platform.

As will be described with further reference to FIG. 11, the at least one motor control circuit 1002 can generate the motor control signals 1004 to cause specific waveforms to be applied to electromagnets of the stator 110 in order to cause resulting motion of magnets of the rotor 120. The motor controller 1000 includes a position encoder 1004 that receives a position signal 1010 from a third network 1008. The third network 1008 can be similar to the first network 710 and second network 1006.

The position signal 1010 indicates positions of magnets of the rotor 120, which the position encoder 1004 can convert into position data that the at least one motor control circuit 1002 can use to determine which electromagnets of the stator 110 to control (and thus how to generate the waveforms to be applied to the electromagnets of the stator 110). Systems and Methods for Dynamically Triggering Independent Stator Coils to Control Rotational Velocity of Rotor Referring now to FIG. 11, a stator system 1100 is shown according to an embodiment of the present disclosure. The stator system 1100 can incorporate features of the stator 110 described with reference to FIGS. 1-5. The stator system 1100 includes at least one magnet controller 1102, such as magnet controllers 1102a, 1102b, and 1102c, which can each execute one phase of a three-phase control scheme. The at least one magnet controller 1102 receives motor control signals 1004 from the second network 1006. For example, as depicted in FIG. 11, the first magnet controller 1102a receives the first motor control signal 1004a, the second magnet controller 1102b receives the second motor control signal 1004b, and the third magnet controller receives the third motor control signal 1004c. The stator system 1100 can be used to independently trigger electromagnets of the stator 110 (e.g., stator coils) or groups of electromagnets to output magnetic fields that can be used to rotate the rotor 110 at desired rotation rates about the rotational axis 122.

The stator system 1100 includes a plurality of electromagnets (e.g., electromagnetic coils). FIG. 11 illustrates nine pairs of electromagnets 1110, 1112; 1114, 1116; 1118, 1120; 1122, 1124; 1126, 1128; 1130, 1132; 1134, 1136; 1138, 1140. An electromagnet of each pair can be provided in a corresponding stator rail 404 or 408 as shown in FIG. 4. For example, electromagnets 1110, 1114, 1118, 1122, 1126, 1130, 1134, 1138, and 1142 can be provided in the stator rail 404, and electromagnets 1112, 1116, 1120, 1124, 1128, 1132, 1136, 1140, and 1144 can be provided in the stator rail 408. While FIG. 11 illustrates the stator system 1100 including nine pairs of electromagnets controlled by the three magnet controllers 1102a, 1102b, and 1102c, it will be understood that the stator system 1100 can include additional such modules of magnet controllers and electromagnets—for example, the stator system 1100 can include a circumferential ring of magnet controllers and electromagnets to enable the stator system 1100 to drive the rotor 120 from all around the rotational axis 122.

The first magnet controller 1102a can control operation of electromagnets 1110, 1112; 1122, 1124; and 1134, 1136. For example, the first magnet controller 1102a can transmit individual magnet control signals to each of the electromagnets 1110, 1112; 1122, 1124; and 1134, 1136. In some embodiments, the stator system 1100 includes a first actuator 1142 coupled to the electromagnet 1110 and a second actuator 1144 coupled to the electromagnet 1112. The first actuator 1142 and second actuator 1144 can be implement using a switch circuit, such as a metal oxide semiconductor field effect transistor (MOSFET). The stator system 1100 can include an actuator coupled to each electromagnet (as depicted in FIG. 11).

The at least one magnet controller 1102 can transmit magnet control signals to control operation of the electromagnets, such as by executing pulse-width modulation (PWM) based on the received motor control signals 1004 to control at least one of a current or a voltage of the outputted magnet control signal based on the received motor control signals 1004. For example, by increasing a duty cycle of the control signals using PWM, the at least one magnet controller 1102 can cause the electromagnets to output magnetic fields having relatively greater field strengths. The first magnet controller 1102a can transmit a first magnet control signal to cause the first actuator 1142 to drive a first electrical signal through the electromagnet 1110, causing the electromagnet 1110 to output a corresponding first magnetic field, and can transmit a second magnet control signal to cause the second actuator 1142 to drive a second electrical signal through the electromagnet 1112 to output a corresponding second magnetic field. As the magnet controllers 1102 control the electromagnets (e.g., based on the magnetic force output from the electromagnets, based on a switching rate between the electromagnets outputting magnetic fields, and so forth), the magnet controller 1102 can control the rotational velocity of the rotor 120 relative to the stator 110. The switching rate can correspond to a rate of current being driven through respective electromagnets, or a rate of pulse output by the at least one magnet controller 1102. The magnet controllers 1102 may modify the switching rate by changing a rate by which the electromagnets are sequentially excited to produce a respective magnetic field. The magnet controllers 1102 may modify the magnetic force (e.g., based on magnitude of magnetic field strength of the respective magnetic field) by increasing the current, increasing the duty cycle, and so forth. For instance, the magnetic controller 1102 can increase the magnetic force to increase the rotational velocity, increase the switching rate to increase the rotational velocity, and so forth. By increasing the rotational velocity, the rotor blades 124, 126 can produce more lift. In some embodiments, the magnet controller 1102a can control the electromagnets 1110, 1112; 1122, 1124; and 1134, 1136 at a first switching rate, and the second magnet controller 1102b can control the electromagnets 1114, 1116; 1126, 1128; and 1138, 1140 at a second switch rate different than the first switching rate.

The second magnet controller 1102b can control operation of electromagnets 1114, 1116; 1126, 1128; and 1138, 1140. For example, the second magnet controller 1102b can transmit individual magnet control signals to each of the electromagnets 1114, 1116; 1126, 1128; and 1138, 1140. The third magnet controller 1102c can control operation of electromagnets 1118, 1120; 1130, 1132; and 1142, 1144. For example, the third magnet controller 1102c can transmit individual magnet control signals to each of the electromagnets 1118, 1120; 1130, 1132; and 1142, 1144. As the magnet controllers 1102 control the electromagnets (e.g., based on the magnetic force output from the electromagnets, based on the switching rate between the electromagnets outputting magnetic fields, and so forth), the magnet controller 1102 can control the rotational velocity of the rotor 120 relative to the stator 110. The magnet controllers 1102 may modify the switching rate by changing a rate by which the electromagnets are sequentially excited to produce a respective magnetic field. For instance, the magnetic controller 1102 can increase the magnetic force to increase the rotational velocity, increase the switching rate to increase the velocity, and so forth. By increasing the velocity, the rotor blades 124, 126 can produce more lift.

Systems and Methods for Dynamically Triggering Independent Stator Coils to Control Pitch of Rotor Blade The present solution can be used to control pitch angles of rotor blades 1164 by independently triggering and controlling operation of electromagnets or groups of electromagnets of the stator system 1100, in turn controlling the respective magnetic fields outputted by the electromagnets that interact with the rotor 120 and magnets thereof. For example, the magnet controllers 1102 can output control signals having duty cycles, magnitudes, switching rates, or other parameters that selectively control the electromagnets of the stator system 1100 to output desired magnetic fields. In the configuration depicted in FIG. 11, the third magnet controller 1102c has outputted a magnet control signal to cause electromagnet 1120 to output an electromagnetic field 1152. The third magnet controller 1102c configures the electromagnetic field 1152 to repulse a first rotor magnet 1160 (e.g., a lower rotor magnet of the two rotor magnets 380 interacting with rotor blade 124 as shown in FIGS. 4-5), such as by timing a magnitude and polarity of the electromagnetic field 1152 to repulse a corresponding lagging-side pole of the first rotor magnet 1160. The second magnet controller 1102b has outputted a magnet control signal to cause electromagnet 1128 to output an electromagnetic field 1154, which is configured to attract the first rotor magnet 1160, such as by timing a magnitude and polarity of the electromagnetic field 1154 to attract a corresponding leading-side pole of the first rotor magnet 1160. As such, the stator system 1100 can drive the first rotor magnet 1160 at a desired speed along the direction 1170 by controlling the timing, magnitude, and/or polarity of the outputted magnetic fields. Similarly, in the configuration depicted in FIG. 11, the first magnet controller 1102a has outputted a magnet control signal to cause electromagnet 1122 to output an electromagnetic field 1156 to repulse a lagging-side pole of a second rotor magnet 1162, and the third magnet controller 1102c has outputted a magnet control signal to cause electromagnet 1130 to output an electromagnetic field 1158 to attract a leading-side pole of the second rotor magnet 1162, thus driving the second rotor magnet 1162 at a desired speed (which can be different than the speed at which the first rotor magnet 1160 is driven) along the direction 1170.

The rotor blade 1164 is coupled to the first and second rotor magnets 1160, 1162, and thus can be driven along the direction 1170 by movement of the first and second rotor magnets 1160, 1162. As such, the stator system 1100 can generate desired lift based on the speed at which the rotor blade 1164 is driven, as well as the pitch angle at which the rotor blade 1164 is oriented. As will be described with further reference to FIG. 12, the stator system 1100 can selectively lag and lead the first and second rotor magnets 1162, 1164 relative to one another (based on the motor control signals 1004 received from the motor controller 1000) to adjust the pitch angle of the rotor blade 1164, enabling lift, yaw, pitch, and roll control. In addition, the stator system 1100 can maintain synchronicity with the rotor magnets 1160, 1162 due to the combined attraction and repulsion applied to each pair of rotor magnets 1160, 1162.

As the rotor magnets 1160, 1162 are driven along the direction 1170, the at least one magnet controller 1102 can continue to use received motor control signals 1004 to selectively activate electromagnets (including the depicted electromagnets 1110, 1112; 1114, 1116; 1118, 1120; 1122, 1124; 1126, 1128; 1130, 1132; 1134, 1136; 1138, 1140), and thus drive the rotor magnets 1160, 1162 throughout a full rotation about the stator system 1100.

The stator system 1100 includes a position encoder 1104. The position encoder 1104 can transmit a position signal indicating a position of each rotor blade (e.g., rotor blade 1164) via the third network 1008 to the position encoder 1004 of the motor controller 1000, so that the motor controller 1000 can use the position of each rotor blade to generate appropriate motor control signals 1004 to transmit to the stator system 1100. The position encoder 1004 can be distributed throughout the stator 110 in a similar manner as the configuration of the stator system 1100 shown in FIG. 11 can be distributed throughout the stator 110 to enable full circumferential operation.

The position encoder 1104 can include a back electromotive force (EMF) encoder that measures a back EMF of each electromagnet of the stator system 1100, and determines the positions of rotor magnets 1160, 1162, and thus rotor blades 1164, based on the measured back EMF. For example, at each motor control state, the position encoder 1104 can detect a back EMF of a distributed selection of unpowered electromagnets of the stator system 1100; the zero crossing of the voltage signal in each of the electromagnets can indicate the passing of the corresponding rotor magnets 1160, 1162 over the center of the electromagnet coil. The position encoder 1104 and/or the position encoder 1004 of the motor controller 1000 can use a high resolution of rotor magnet positions, combined with a Kalman filter to produce a high speed measurement and prediction of blade position/pitch for a large number of blades, in order to generate motor control signals 1004 with highly precise timing.

Systems and Methods for Variable Blade Pitch Control

The present solution can enable various solutions for independent, variable blade pitch control of the pitch of rotor blades (e.g., rotor blades 124, 126, 1164), allowing for directional control of the VTOL platform 100 based on the individual and collective pitches (e.g., pitch angle) of the rotor blades. In implementations in which the VTOL platform 100 is used as a vehicle, it may be desirable to move the VTOL platform 100 in different directions. The systems and methods described herein may modify the pitch angle of the rotor blades to achieve an overall desired movement of the rotor and, thus, the VTOL platform 100.

In some embodiments, the system includes a rotor and a stator. The rotor includes a first rotor magnetic component aligned with one or more first stator coils. The rotor includes a second rotor magnetic component aligned with one or more second stator coils and adjacent to the first rotor magnetic component. The rotor includes an arm connecting the first rotor magnetic component and the second rotor magnetic component. A first arm end of the arm is coupled with the first rotor magnetic component and a second arm end of the arm coupled with the second rotor magnetic component which together define an arm angle which changes based on a first magnetic force applied to the first rotor magnetic component relative to a second magnetic force applied to the second rotor magnetic component. The rotor includes a first rotor blade fixed to the arm, the first rotor blade extending from the arm along a blade pitch axis. The first rotor blade defines a blade pitch angle relative to the blade pitch axis with the blade pitch angle corresponding to the arm angle. The stator includes a plurality of electromagnets configured to output at least a first magnetic field that drives the first rotor magnetic component and a second magnetic field that drives the second rotor magnetic component responsive to control signal(s). The control signal(s) cause the first magnetic field to apply the first magnetic force on the first rotor magnetic component and the second magnetic field to apply the second magnetic force on the second magnetic component to control the blade pitch angle.

In some embodiments, the system includes a rotor and a stator which rotates the rotor about a rotational axis. The rotor includes an annular rotor base defining the rotational axis and including a plurality of rotor segments arranged around the stator. Each rotor segment includes a first rotor blade configured to be rotated about a blade pitch axis perpendicular to the rotational axis. The rotor segments include a power receiver circuit. The rotor segments include a motor that rotates using power received via the power receiver circuit for rotating the first rotor blade about the blade pitch axis. The rotor segments include a motor controller that provides a motor signal to the motor for rotating the first rotor blade about the blade pitch axis responsive to a control signal. The rotor segments include a first wireless transceiver that receives the control signal and provides the control signal to the motor controller. The stator includes a second wireless transceiver that receives a control command and wirelessly transmits the control signal to the first wireless transceiver based on the control command. The stator includes a power transmitter circuit that outputs a magnetic field that interacts with the power receiver circuit to provide power to the power receiver circuit.

Figure 12:
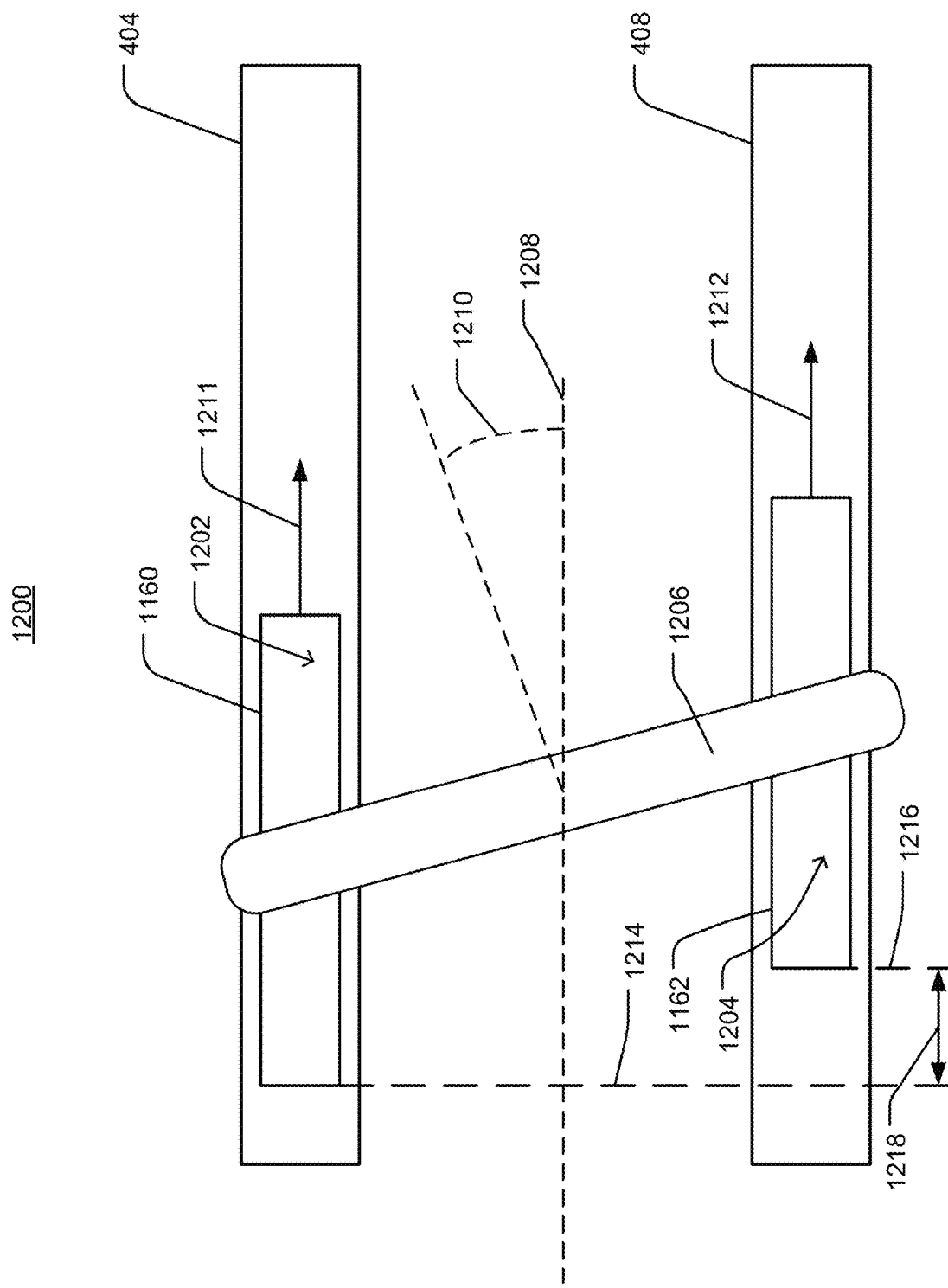
FIG. 12 is a block diagram of a rotor control system of a VTOL platform.

Referring now to FIG. 12, a rotor control system 1200 is shown according to an embodiment of the present disclosure. The rotor control system 1200 can enable frictionless blade pitch control, and can avoid difficulties that may arise from applying traditional pitch control approaches to the form factors achieved by the present solution. For example, existing systems typically use a swashplate to transfer directional control inputs into rotor pitch control. However, when applied to a larger radius rotating at a comparable rotation rate, the radial velocity of the hub of the ring may be significantly larger, which can result much larger friction losses, require more material to support cyclic loads in fatigue strength resulting in larger more heavily reinforced bearing solutions, may require intricate cooling methods, may result in large amounts of wear and more maintenance, and may increase of mechanical noise from cyclic loading of high speed bearings that could mitigate improved noise performance that could otherwise be achieved by the annular and electric motor configuration. The rotor control system 1200 can avoid these difficulties by driving rotor blade rotation using controlled electromagnetic fields across an air gap.

As shown in FIG. 12, the rotor control system 1200 includes a first (e.g., upper) magnet member 1202 supporting the first rotor magnet 1160, and a second (e.g., lower) magnet member 1204 supporting the second rotor magnet 1162. The first magnet member 1202 is coupled to the second magnet member 1204 by an arm 1206. A rotor blade (e.g., rotor blade 1164 described with reference to FIG. 11) is fixed to the arm 1206, such that as the arm 1206 rotates about a pitch axis (extending into the view shown in FIG. 12) perpendicular to a direction of movement 1208 of the magnet members 1202, 1204 (the direction of movement 1208 being about a rotor axis (e.g., rotational axis 122 shown in FIG. 2)), a pitch angle 1210 of the rotor blade will vary.

An electromagnet of the upper stator rail 404 outputs a first electromagnetic field that applies a first force on the first motor magnet 1160, causing the first magnet member 1202 to be driven forward in direction 1211. The first force will depend on the electrical current driven through the electromagnet of the upper stator rail 404 (as described with reference to FIG. 11) as well as a spatial relationship between the upper stator rail 404 and first motor magnet 1160. Similarly, an electromagnet of the lower stator rail 408 outputs a second electromagnetic field that applies a second force on the second rotor magnet 1162 to drive the second magnet member 1204 forward in direction 1212. Based on the initial positions of the magnet members 1202, 1204, and the magnitudes of the first and second forces, the magnet members 1202, 1204 will move to positions resulting in a lag/lead distance 1218 between the magnet members 1202, 1204 (e.g., as measured from planes 1214, 1216 at ends of the magnet members 1202, 1204). The lag/lead distance 1218 corresponds to the pitch angle 1210, as the arm 1206 is fixed to the magnet members 1202, 1204, and will rotate as the lag/lead distance 1218 changes.

In various embodiments, the synchronizing force of the electromagnetic fields that the stator (e.g., stator 110, stator system 1100) applies to the rotor magnets 1160, 1162 may be approximately the same in magnitude as a maximum driving force of the stator. As such, the rotor control system 1200 can be configured such that the stator and corresponding magnet members 1202, 1204 (e.g., rotor magnets 1160, 1162) are sized to produce a moving electromagnetic field across an air gap between the stator rails 404, 408 and magnet members 1202, 1204 which is large enough that a minimum linear driving force of the stator to an individual magnet member 1202, 1204, between phases, is larger than a maximum combination of the following forces: the peak blade drag on the rotor blade (e.g., rotor blade 1164), a reactionary force of a peak aerodynamic pitching moment about a ¼ cord of the rotor blade, and a reactionary force of a maximum blade rotational inertia about a feathering axis of the rotor blade at a maximum cyclic pitch setting in overspeed operation. In various such embodiments, the number of rotor blades can be selected based on such factors, as too few blades may lead to large magnet arrays mounted to each rotor blade hub, and too many rotor blades may lead to and increased weight.

Figure 13:
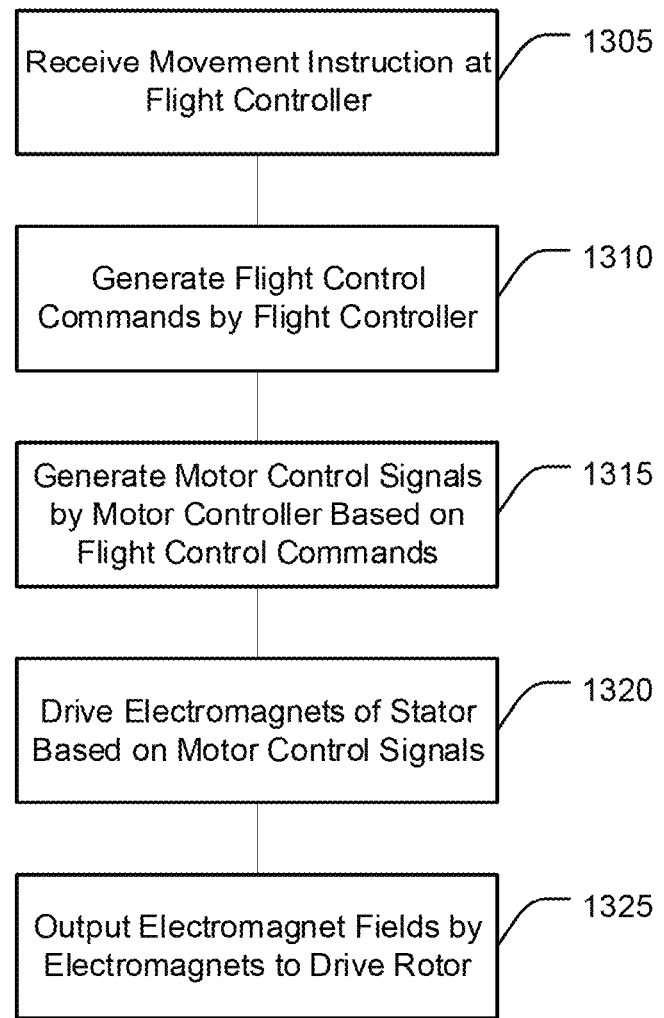
FIG. 13 is a flow diagram of an embodiment of a method of controlling a VTOL platform.

Referring now to FIG. 13, a method 1300 for controlling operation of a VTOL platform is shown according to an embodiment of the present disclosure. The method 1300 can be implemented using various systems and components disclosed herein, including the VTOL platform 100, the VTOL system 300, the flight controller 700, the motor controller 1000, the stator system 1100, and the rotor control system 1200.

At 1305, a flight controller of a VTOL platform receives a movement instruction indicating a desired movement of the VTOL platform. The operation instruction can be received from a user interface configured to receive a user input. The operation instruction can be received from an autopilot; for example, the desired movement can be indicated to be movement towards a waypoint of a flight plan.

At 1310, the flight controller generates one or more flight control commands based on the desired movement. The flight controller can use a flight dynamics model to generate the one or more flight control commands. For example, the flight dynamics controller can use the flight dynamics model to calculate a lift expected to be generated by a rotor of the VTOL platform, given pitch angles of rotor blades of the VTOL platform. The flight dynamics controller can execute flight dynamics control laws to convert instructions indicative of desired movement (e.g., instructions extracted via operator input indicating desired movement to a higher altitude at a particular vertical speed and airspeed), and use the flight dynamics model to determine how to control operation of the rotor blades to generate lift, yaw, pitch, and/or roll expected to achieve the desired movement. In some embodiments, the flight controller generates the one or more flight control commands to execute collective pitch control to cause the VTOL platform to generate lift. In some embodiments, the flight controller generates the one or more flight control commands to execute cyclic pitch control to cause the VTOL platform to generate movement about pitch and/or roll angles.

At 1315, a motor controller generates one or more motor control signals based on the flight control command(s). The motor controller can generate the motor control signals to cause specific waveforms to be applied to electromagnets of a stator of the VTOL platform, in order to cause the electromagnets to output electromagnetic fields expected to cause the VTOL platform to execute the desired movement indicated by the movement instruction. In some embodiments, the motor controller receives a position signal indicating positions of rotor blades of the rotor, which the motor controller can use to generate the motor control signals to individually control operation of each rotor blade. The motor controller can generate the motor control signals and provide the motor control signals, via one or more transceivers, to control operation of motors coupled with the rotor blades to rotate the rotor blades to desired pitch angles.

At 1320, the stator drives the electromagnets of the stator based on the motor control signals. For example, the stator can use a plurality of magnet controllers to drive electrical signals at desired current and/or voltage to each electromagnet based on the motor control signals. The magnet controllers can execute PWM to drive electrical signals through each electromagnet. In some embodiments, the magnet controllers operate switch circuits, such as MOSFET circuits, to selectively drive electrical signals through each electromagnet based on the motor control signals. In some embodiments, levitation/guidance magnets of the stator output magnetic fields that interact with corresponding magnets of the rotor to rotate the rotor.

At 1325, the electromagnets output electromagnetic fields corresponding to the electrical signals driven through each electromagnet. Magnets of the rotor are in turn moved by the electromagnetic fields. In some embodiments, the rotor includes a plurality of rotor blades, each coupled to a pair of magnets via a rotor arm, such that selective movement of the magnets can vary a pitch angle of the rotor blade, resulting in desired lift, yaw, pitch, and/or roll. In some embodiments, motors of the rotor receive power via the electromagnetic fields and use the power to rotate respective rotor blades.

Figure 14A:
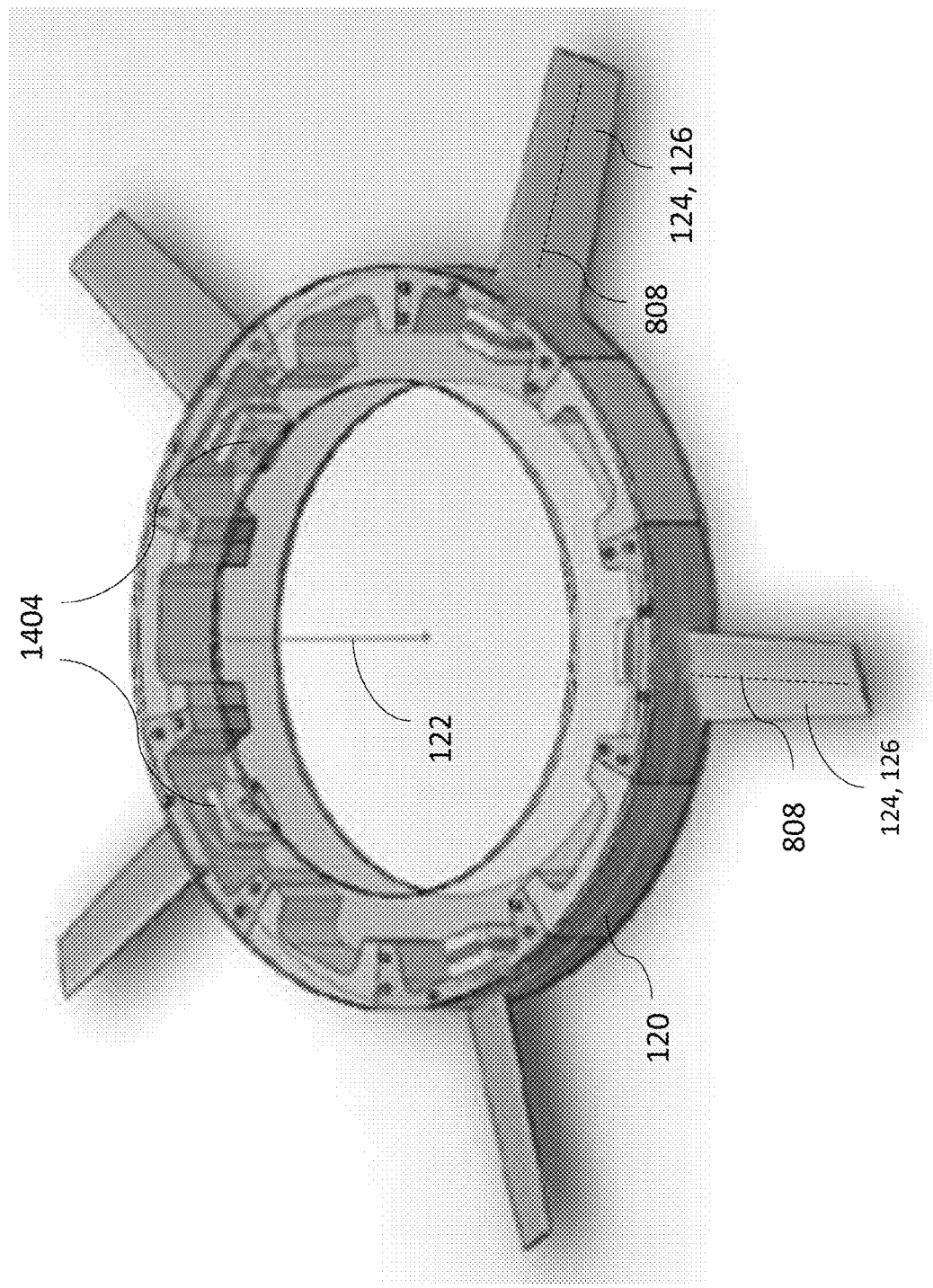
FIG. 14A is a schematic diagram of an embodiment of a rotor having motor-driven rotor blades.
Figure 14B:
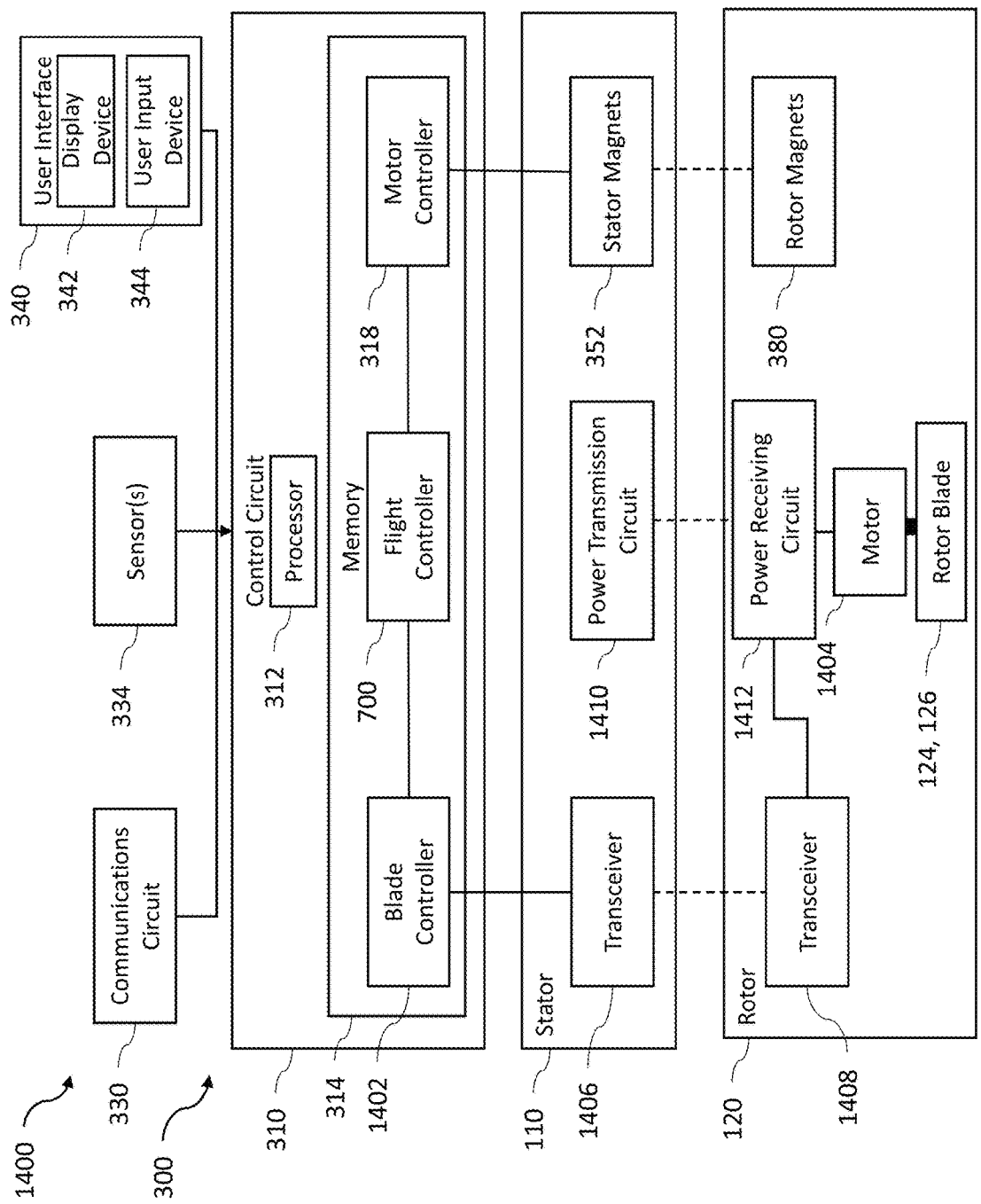
FIG. 14B is a block diagram of an embodiment of a rotor control system using motor-driven rotor blades.

Referring now to FIGS. 14A and 14B, a rotor control system 1400 is shown according to an embodiment of the present disclosure. Various elements and components shown in the embodiment depicted in FIGS. 14A and 14B are similar to those elements and components described above with reference to FIG. 1-13. Therefore, the same reference numerals are used to indicate similar features. The rotor control system 1400 is shown to include a blade controller 1402. The blade controller 1402 may be any element, device, component, script, etc. designed or implemented to control movement of rotor blades 124, 126 to produce or achieve a desired movement. The blade controller 1402 may be similar in some aspects to the flight controller 700 described above. In some implementations, the blade controller 1402 may be embodied on or a component of the flight controller 700. The blade controller 1402 may be configured to determine a desired pitch angle for the rotor blade(s) 124, 126 (e.g., a blade pitch angle). The blade controller 1402 may determine (e.g., based on a maintained ledger of commands, based on data from an encoder coupled directly or indirectly to the rotor blade 124, 126, etc.) a current position of the rotor blade(s) 124, 126. The blade controller 1402 may be configured to modify the pitch angle for the rotor blade(s) 124, 126 to achieve the desired pitch angle to result in a desired movement. As described in greater detail below, the blade controller 1402 may be configured to generate motor control signals to a motor 1404 coupled to the rotor blade(s) 124, 126 to move the rotor blade(s) 124, 126 to the desired pitch angle.

The blade controller 1402 may be configured to generate motor control signals for communicating to the motor 1404 to move the motor 1404. In some implementations, the blade controller 1402 may generate a Pulse Width Modulated (PWM) signal for the motor 1404. The PWM signal may have a duty cycle which moves the motor a certain number of steps or rotational angle. The blade controller 1402 may communicate the motor control signals to the motor through the stator 110. In some implementations, each rotor blade 124, 126 may correspond to a dedicated blade controller 1402. In other implementations, a plurality of rotor blades 124, 126 may be controlled by a common blade controller 1402.

The blade controller 1402 is shown to be coupled to a transceiver 1406 of the stator 110, which is communicably coupled to a transceiver 1408 of the rotor 120. The transceivers 1406, 1408 may be any device(s), component(s), element(s), circuit(s), etc. designed or implemented to wirelessly transmit data over a distance. The transceivers 1406, 1408 may be configured to communicate according to various protocols. For instance, the transceivers 1406, 1408 may be configured to communicate via a ZigBee (e.g., high frequency) data transmission protocol. In still other embodiments, the transceivers 1406, 1408 may be configured to communicate via a Near-Field Communication (NFC) protocol, a Radio Frequency Identification (RFID) protocol, an Infrared (IR) or other free-space optical communication transmission protocol, etc.

The stator 110 is shown to include a power transmission circuit 1410. The power transmission circuit 1410 may be any device(s), component(s), element(s), or circuit(s) designed or implemented to transmit power over a distance. The rotor 120 may correspondingly include a power receiving circuit 1412. The power receiving circuit 1412 may be any device(s), component(s), element(s), or circuit(s) designed or implemented to receive power over a distance. The power transmission circuit 1410 and power receiving circuit 1412 may be coupled to each other such that the power transmission circuit 1410 wirelessly transmits power to the power receiving circuit 1412. In some implementations, the power transmission circuit 1410 and power receiving circuit 1412 may be coupled to each other via magnetodynamic coupling. In other implementations, the power transmission circuit 1410 and power receiving circuit 1412 may be coupled to one other via inductive coupling (e.g., Qi or some other form of inductive coupling), resonant inductive coupling, laser coupling, and so forth. The power receiving circuit 1412 may be configured to transfer power received from the power transmission circuit 1410 to the transceiver 1408 of the rotor 120 and to the motor 1404. Thus, the transceiver 1408 and motor 1404 may be wirelessly powered. In some implementations, the power receiver circuit 1412 may include a rectification circuit (e.g., via sets of diodes) to rectify an AC supply to drive a DC load as needed. In some implementations, the power receiver circuit 1412 may include a step-up or step-down circuit for stepping up (or stepping down) a voltage/current/power to drive a particular load or device (such as the motor 1404 or transceiver 1408 of the rotor 120).

The transceiver 1408 of the rotor 120 may be configured to wirelessly receive motor control signals from the transceiver 1406 of the stator 110. The transceiver 1408 may be configured to provide the motor control signals to the motor 1404. The motor 1404 may be configured to drive the rotor blade(s) 124, 126. The motor 1404 may be or include various types of motor 1404 designed or implemented to control the position of the rotor blade(s) 124, 126 For instance, the motor 1404 may be an Air-Core BM-BLDC motor. In other embodiments, the motor 1404 may be a stepper motor, a gear tooth servo actuator (e.g., remote controlled (RC)) motor, an Iron-Core PM-BLDC, or other type of motor. The motor 1404 may be configured to receive the motor control signals from the blade controller 1402 via the transceivers 1406, 1408. The rotor 120 may include an encoder coupled to the motor 1404 and/or rotor blade(s) 124, 126 configured to detect a position of the motor 1404 and/or rotor blade(s) 124, 126. The encoder may be configured to provide data corresponding to the position of the motor 1404/rotor blade(s) 124, 126 to the blade controller 1402, which the blade controller 1402 uses as feedback for adjusting the position of the rotor blade(s) 124, 126.

References to "or" may be construed as inclusive so that any terms described using "or" may indicate any of a single, more than one, and all of the described terms. References to at least one of a conjunctive list of terms may be construed as an inclusive OR to indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

The construction and arrangement of the systems and methods as shown in the various exemplary embodiments are illustrative only. Although only example embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements can be reversed or otherwise varied and the nature or number of discrete elements or positions can be altered or varied. Accordingly, such modifications are intended to be included within the scope of the present disclosure. The order or sequence of any process or method steps can be varied or re-sequenced according to alternative embodiments. Other substitutions, modifications, changes, and omissions can be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A system, comprising:
   a rotor, comprising:
      a sidewall, a first rotor wall extending from a first end of the sidewall, and a second rotor wall extending from a second end of the sidewall, the second rotor wall spaced from the first rotor wall;
      at least one first rotor magnet coupled with the first rotor wall; and
      at least one second rotor magnet coupled with the second rotor wall;
   a stator, comprising:
      a support structure extending between the first rotor wall and second rotor wall;
      at least one first stator magnet coupled with a first surface of the support structure and proximate to the at least one first rotor magnet, the at least one first rotor magnet inducing a current in the at least one first stator magnet corresponding to a first distance between the at least one first stator magnet and at least one first rotor magnet; and
      at least one second stator magnet coupled with a second surface of the support structure opposite the first surface and proximate to the at least one second rotor magnet, the at least one second stator magnet electrically coupled with the at least one first stator magnet to receive the current from the first stator magnet, the at least one second stator magnet outputting a magnetic field having a magnetic field strength based on the current from the first stator magnet, the magnetic field interacting with the at least one second rotor magnet to control a second distance between the at least one second stator magnet and the at least one second rotor magnet.

2. The system of claim 1, wherein the induced current increases as the first distance decreases and, as the induced current increases, the magnet field strength of the magnetic field of the at least one second stator magnet increases to attract the at least one second rotor magnet, thereby decreasing the second distance.

3. The system of claim 1, wherein the at least one first rotor magnet and the at least one second rotor magnet are arranged along a rotor axis extending parallel to a rotational axis of the rotor.

4. The system of claim 1, wherein the at least one first stator magnet and the at least one second stator magnet are arranged along a stator axis, the rotor axis and stator axis being aligned.

5. The system of claim 1, wherein the rotor further comprises at least one third rotor magnet coupled with the sidewall, wherein the stator further comprises one or more propulsion magnets of the stator, and wherein the rotor is configured to be driven by the propulsion magnets via a magnetic field of the one or more propulsion magnets interacting with the at least one third rotor magnet.

6. The system of claim 1, wherein the at least one first stator magnet comprises a first pair of electrically coupled stator magnets and the at least one second stator magnet comprises a second pair of electrically coupled stator magnets.

7. The system of claim 1, wherein the at least one first stator magnet includes at least one electromagnetic coil and the at least one second stator magnet includes at least one second electromagnetic coil.

8. The system of claim 1, wherein the rotor comprises a plurality of rotor segments, each rotor segment including a respective sidewall, first rotor magnet, and second rotor magnet.

9. The system of claim 1, wherein the magnetic field is a first magnetic field, and the at least one first stator magnet outputs a second magnetic field corresponding to the induced current that repels the first rotor magnet as the first distance decreases.

10. The system of claim 1, wherein the magnetic field is a first magnetic field, and the at least one first stator magnet outputs a second magnetic field corresponding to the induced current that attracts the first rotor magnet as the first distance increases.

11. A vehicle, comprising:
    a rotor, comprising:
       a sidewall, a first rotor wall extending from a first end of the sidewall, and a second rotor wall extending from a second end of the sidewall, the second rotor wall spaced from the first rotor wall;
       at least one first rotor magnet coupled with the first rotor wall; and
       at least one second rotor magnet coupled with the second rotor wall;
    a stator adjacent to the rotor, comprising:
       a support structure extending between the first rotor wall and second rotor wall;
       a first stator magnet coupled with a first surface of the support structure and proximate to the at least one first rotor magnet, the at least one first rotor magnet inducing a current in the first stator magnet corresponding to a first distance between the at least one first stator magnet and at least one first rotor magnet; and
       a second stator magnet coupled with a second surface of the support structure opposite the first surface and proximate to the at least one second rotor magnet, the second stator magnet electrically coupled with the at least one first stator magnet to receive the current from the first stator magnet, the at least one second stator magnet outputting a magnetic field having a magnetic field strength based on the current from the first stator magnet, the magnetic field interacting with the at least one second rotor magnet to control a second distance between the at least one second stator magnet and the at least one second rotor magnet.

12. The vehicle of claim 11, wherein the induced current increases as the first distance decreases and, as the induced current increases, the magnet field strength of the magnetic field of the second stator magnet increases to attract the at least one second rotor magnet, thereby decreasing the second distance.

13. The vehicle of claim 11, wherein the at least one first rotor magnet and the at least one second rotor magnet are arranged along a rotor axis extending parallel to a rotational axis of the rotor.

14. The vehicle of claim 11, wherein the first stator magnet and the second stator magnet are arranged along a stator axis, the rotor axis and stator axis being aligned.

15. The vehicle of claim 11, wherein the rotor further comprises at least one third rotor magnet coupled with the sidewall, wherein the stator further comprises one or more propulsion magnets of the stator, and wherein the rotor is configured to be driven by the propulsion magnets via a magnetic field of the one or more propulsion magnets interacting with the at least one third rotor magnet.

16. The system of claim 11, wherein the first stator magnet includes at least one electromagnetic coil and the second stator magnet includes at least one second electromagnetic coil.

17. A method, comprising:
providing a rotor comprising a first rotor magnet coupled with a first rotor wall and a second rotor magnet coupled with a second rotor wall;
providing a stator comprising a support structure extending between the first rotor wall and second rotor wall, a first stator magnet coupled with a first surface of the support structure and proximate to the at least one first rotor magnet, and a second stator magnet coupled with a second surface of the support structure opposite the first surface and proximate to the at least one second rotor magnet;
inducing, by the first rotor magnet, a current in the first stator magnet corresponding to a first distance between the at least one first stator magnet and at least one first rotor magnet;
electrically coupling the second stator magnet with the first stator magnet to receive the current from the first stator magnet; and
outputting, by the second stator magnet, a magnetic field having a magnetic field strength based on the current from the first stator magnet, the magnetic field interacting with the at least one second rotor magnet to control a second distance between the at least one second stator magnet and the at least one second rotor magnet.

18. The method of claim 17, wherein the induced current increases as the first distance decreases and, as the induced current increases, the magnet field strength of the magnetic field of the at least one second stator magnet increases to attract the at least one second rotor magnet, thereby decreasing the second distance.

19. The method of claim 17, wherein the rotor further comprises at least one third rotor magnet coupled with the sidewall, wherein the stator further comprises one or more propulsion magnets of the stator, the method further comprising driving, by the propulsion magnets, the rotor via a magnetic field of the one or more propulsion magnets interacting with the at least one third rotor magnet.

20. The method of claim 17, wherein the magnetic field is a first magnetic field, and the first stator magnet outputs a second magnetic field corresponding to the induced current that repels the first rotor magnet as the first distance decreases.

\* \* \* \* \*